(12) United States Patent
Zamir et al.

(10) Patent No.: US 10,691,539 B2
(45) Date of Patent: Jun. 23, 2020

(54) GROWN DEFECT DETECTION AND MITIGATION USING ECC IN MEMORY SYSTEMS

(71) Applicant: Western Digital Technologies, Inc., San Jose, CA (US)

(72) Inventors: Ran Zamir, Ramat Gan (IL); Eran Sharon, Rishon Lezion (IL); Idan Alrod, Herzeliya (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 63 days.

(21) Appl. No.: 16/022,199

(22) Filed: Jun. 28, 2018

(65) Prior Publication Data

US 2020/0004629 A1  Jan. 2, 2020

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0673* (2013.01)

(58) Field of Classification Search
CPC .................................................. G06F 11/1076
USPC .................................................. 714/819, 815
See application file for complete search history.

(56) References Cited

U.S. PATENT DOCUMENTS

| | | | |
|---|---|---|---|
| 2014/0169091 A1 | 6/2014 | Yao et al. | |
| 2016/0179620 A1* | 6/2016 | Bazarsky | H03M 13/116 714/766 |
| 2016/0321000 A1* | 11/2016 | Tuers | G06F 11/1012 |
| 2016/0322990 A1* | 11/2016 | Tuers | G06F 11/1068 |
| 2017/0090788 A1* | 3/2017 | Shlick | G06F 3/0619 |
| 2017/0091028 A1* | 3/2017 | Golan | G11C 16/349 |
| 2017/0163291 A1 | 6/2017 | La Rosa et al. | |
| 2018/0159560 A1* | 6/2018 | Sharon | G06F 3/0619 |

* cited by examiner

*Primary Examiner* — Fritz Alphonse
(74) *Attorney, Agent, or Firm* — Dickinson Wright PLLC; Steven Hurles

(57) ABSTRACT

A controller may detect unreliable bits of data, memory cells, or bit lines during an error correction process of a read operation based on an error correction code used to generate parity bits for the data. In some embodiments, the controller may use the error correction code to determine a distribution of unsatisfied checks. Based on the distribution, the controller may detect group(s) of bits that more closely resemble a defective group of bits rather than a non-defective group of bits. Based on the detection, the controller may set reliability metrics to values that indicate low levels or reliability, which in turn may increase the probability of successfully correcting the errors and reduce the amount of work the controller needs to do in order to complete the error correction process.

24 Claims, 15 Drawing Sheets

GROWN DEFECT DETECTION AND MITIGATION USING ECC IN MEMORY SYSTEMS

BACKGROUND

During manufacturing of memory systems, defects may occur on the memory dies that render certain groups of adjacent bit lines unusable or at least with less reliability. These defects may be detected as part of the manufacturing process, and either replaced using redundant replacement bit lines, or, if the numbers of defective bit lines are too numerous, then the memory die is placed into a lower quality tier or discarded completely.

However, defects may occur in the memory dies after manufacturing, such as due to use of the memory device in its normal operation mode as its programs data into, reads data from, and erases data from the memory cells of the memory dies. These defects, not detected during manufacturing, are referred to as grown defects. Because these defects were not detected during manufacturing, the memory system is not pre-programmed with knowledge of these defective storage locations. In turn, when a controller of the memory system reads data from the defective storage locations, it assumes that the storage locations do not have defects and instead are reliable. Consequently, during a read operation when the controller performs error correction on the bits, the controller may assume a high likelihood of reliability of the bit values of the bits, even though in actuality the bits are stored in defective storage locations. In turn, the controller may fail or struggle to complete error correction.

One reason that the controller may fail or struggle to complete error correction is that the soft bits that the controller uses to identify likelihoods of reliability are not informative for bits stored in defective storage locations, since such bits may have a substantially low chance of having correct bit values. Another reason is that some error correction codes used to generate the parity bits have a relatively high degree of sensitivity to collections of consecutive or bursts of bits. Consequently, if a plurality of adjacent bit lines or memory cells are defective, such as due to grown defects, the errors of the bits stored in the defective memory cells may have a pattern of data values that aligns with the code structure of the error correction code, creating a weakness in the error correction code. Accordingly, ways to detect unreliable bits or unreliable memory components used to program and read the bits to/from the memory dies, including bits and/or memory components that are unreliable due to grown defects, may be desirable.

BRIEF DESCRIPTION OF THE DRAWINGS

The accompanying drawings, which are incorporated in and constitute a part of this specification illustrate various aspects of the description to explain its principles. Wherever convenient, the same reference numbers will be used throughout the drawings to refer to the same or like elements.

DETAILED DESCRIPTION

Figure 1A:
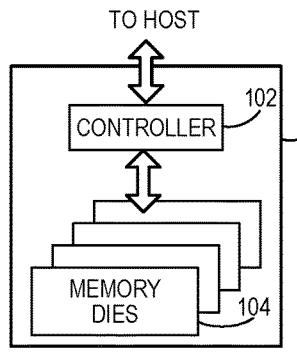
FIG. 1A is a block diagram of an example memory system.

The following embodiments describe apparatuses, devices, systems, circuits, and methods for detecting unreliable bits of data, unreliable memory cells, and/or bit lines based on the error correction code used to generate parity bits for the data. During a read operation to read a data set, when the ECC engine is performing error correction on the bits of the data set, the ECC engine may use the error correction code to calculate numbers of unsatisfied checks connected to variable nodes for the bits. Based on the numbers of unsatisfied checks, the ECC engine may calculate scores for bit groups of the bits, and from the scores, identify one or more of the bit groups as unreliable. In some embodiments, the ECC engine determines empirical distributions of the numbers of unsatisfied checks for the bits groups, and compares the empirical distributions with an expected distribution of unsatisfied checks for unreliable bits and/or an expected distribution of unsatisfied checks for reliable bits. Based on the comparison, the ECC engine may determine which of the empirical distributions are sufficiently close or similar to the expected distribution for unreliable bits, and in response, detect those sufficiently close bit groups as unreliable.

In response to the detection, the ECC engine may set initial reliability metrics, such as initial log likelihood ratios (LLRs), to values that more accurately indicate relatively low levels of reliability for bits of the unreliable bit groups. In turn, when the ECC engine determines updated reliability metrics to correct incorrect bit values, the ECC engine determines the updated reliability metrics based on the initial reliability metrics set to more accurate levels of reliability dependent on the detection. In turn, the ECC engine has an increased probability of successfully correcting all of the bit errors, and/or has a higher success rate at correcting all of the bit errors over a plurality of error correction processes, even though some of the bits are stored in unreliable storage locations, such as due to grown defects. In addition or alternatively, through determination of more accurate initial unreliability metric values based on the detection, the ECC engine may reach convergence in fewer iterations, resulting in faster and more efficient error correction processes and overall faster and more efficient read operations, in turn consuming less power to correct bit errors.

In one embodiment, a circuit includes a memory array including a plurality of memory cells, and a controller configured to: receive a bit group of data stored in the memory array; generate an empirical distribution for the bit group based on an error correction code; compare the empirical distribution for the bit group with an expected distribution; and in response to the comparison, identify that the bit group is unreliable.

In some embodiments, the controller is configured to calculate a statistical similarity between the empirical distribution and the expected distribution to compare the empirical distribution with the expected distribution.

In some embodiments, the controller is further configured to: calculate a score based on the statistical similarity, and identify that the bit group is unreliable based on the score.

In some embodiments, the controller is configured to identify that the bit group is unreliable in response to the score satisfying a threshold.

In some embodiments, the controller is configured to identify that the bit group is unreliable in response to the score being one of a predetermined number of highest ranked scores.

In some embodiments, the expected distribution includes an expected distribution of numbers of unsatisfied checks for an unreliable bit group.

In some embodiments, the statistical similarity includes a first statistical similarity, and the controller is further configured to calculate a second statistical similarity between the empirical distribution and an expected distribution of numbers of unsatisfied checks for a reliable bit group, and calculate the score based on the first statistical similarity and the second statistical similarity.

In some embodiments, the controller is configured to calculate the score based on a ratio between the first statistical similarity and the second statistical similarity.

In some embodiments, the controller is configured to calculate the score based on a difference between the first statistical similarity and the second statistical similarity.

In some embodiments, the controller is further configured to generate a plurality of empirical distributions for a plurality of bit groups of a codeword, where the bit group comprising one of the plurality of bit groups. In addition, the controller is further configured to compare the plurality of empirical distributions with the expected distribution, and identify that at least the bit group of the plurality of bit groups is unreliable based on the comparisons.

In some embodiments, the controller is configured to generate the empirical distribution based on numbers of unsatisfied checks connected to variable nodes for bits of the bit group.

In another embodiment, a circuit includes a memory configured to store a data set received from a memory die during a read operation, a check circuit, an unreliable memory detection circuit, and an initial reliability metric circuit. The check circuit is configured to calculate a plurality of numbers of unsatisfied checks for a plurality of bit groups of the data set. The unreliable memory detection circuit is configured to detect an unreliable memory cell based on the plurality of numbers of unsatisfied checks. The initial reliability metric circuit is configured to set an initial reliability metric value for a bit stored in the unreliable memory cell based on the detection.

In some embodiments, a reliability metric update circuit is configured to adjust an updated reliability metric value for the data set based on the initial reliability metric value.

In some embodiments, the reliability metric update circuit is configured to adjust a plurality of updated reliability metric values over a plurality of cycles of a reliability metric update process dependent on the initial reliability metric value.

In some embodiments, the initial reliability metric includes an initial log likelihood ratio (LLR) value.

In some embodiments, the initial reliability metric circuit is configured to adjust the initial reliability metric value to reduce a likelihood that the bit has a correct bit value.

In some embodiments, the check circuit is configured to calculate the plurality of numbers of unsatisfied checks in response to a triggering event occurring after a start of a reliability metric update process to error correct the data set.

In some embodiments, the unreliable memory detection circuit is configured to detect the unreliable memory cell in response to a triggering event occurring after a start of a reliability metric update process to error correct the data set.

In another embodiment, a system includes a memory die and a controller. The controller includes a parity bit generator circuit, a memory interface circuit, a data retrieval circuit, a scoring circuit, and an unreliable memory identification circuit. The parity bit generator circuit is configured to generate a plurality of parity bits for a set of information bits based on an error correction code, and append the plurality of parity bits to the set of information bits to form a codeword. The memory interface circuit is configured to output the codeword to the memory die for storage. The data retrieval circuit is configured to receive the codeword from the memory die during a read operation. The scoring circuit is configured to calculate a score for the codeword based on the error correction code used to generate the parity bits. The unreliable memory identification circuit is configured to detect that a portion of the codeword is stored in an unreliable group of memory cells based on the score.

In some embodiments, the scoring circuit is configured to calculate the score based on numbers of unsatisfied checks of bits that comprises the portion stored in the unreliable group of memory cells.

In another embodiment, a method includes: receiving, with a controller, a data set during a read operation; calculating, with a controller, a plurality of empirical distributions for a plurality of groups of bits of the data set based on numbers of unsatisfied checks of the bits of the data set; detecting, with the controller, an unreliable bit line based on the plurality of empirical distributions; and storing, with the controller, an identifier that identifies the unreliable bit line in a memory.

In another embodiment, a circuit includes: a means for receiving a bit group of data stored in a memory array; a means for comparing an empirical distribution for the bit group with an expected distribution; and a means for identifying that the bit group is unreliable in response to the comparison.

Other embodiments are possible, and each of the embodiments can be used alone or together in combination. Accordingly, various embodiments will now be described with reference to the attached drawings.

FIG. 1A is a block diagram illustrating a memory system 100. The memory system 100 may include a controller 102 and memory that may include or be made up of one or more memory dies 104. As used herein, the term die refers to the set of memory cells, and associated circuitry for managing the physical operation of those memory cells, that are formed on a single semiconductor substrate. The controller 102 may interface with a host system and transmit command sequences for read, program, and erase operations to the non-memory die(s) 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, the controller 102 is a device that manages data stored in the memory die(s) and communicates with a host, such as a computer or electronic device. The controller 102 can have various functionality in addition to the specific functionality described herein. For example, the controller 102 can format the memory dies 104 to ensure the it is operating properly, map out bad flash memory cells, and allocate spare cells to be substituted for future failed cells. Some part of the spare cells can be used to hold firmware to operate the controller 102 and implement other features. In operation, when a host needs to read data from or write data to the memory die(s) 104, the host will communicate with the controller 102. If the host provides a logical address to which data is to be read/written, the controller 102 can convert the logical address received from the host to a physical address in the memory die(s) 104. (Alternatively, the host can provide the physical address). The controller 102 can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable interface, such as flash interface, including those configured for Toggle Mode 200, 400, 800, 1000 or higher. For some example embodiments, the memory system 100 may be a card based system, such as a secure digital (SD) or a micro secure digital (micro-SD) card. In alternate example embodiments, the memory system 100 may be part of an embedded memory system.

In the example illustrated in FIG. 1A, the memory system 100 is shown as including a single channel between the controller 102 and the non-volatile memory die(s) 104. However, the subject matter described herein is not limited to memory systems having a single memory channel. For example, in some memory systems, such as those embodying NAND architectures, 2, 4, 8 or more channels may exist between the controller 102 and the memory die(s) 104, depending on controller capabilities. In any of the embodiments described herein, more than a single channel may exist between the controller and the memory die(s)s 104, even if a single channel is shown in the drawings.

Figure 1B:
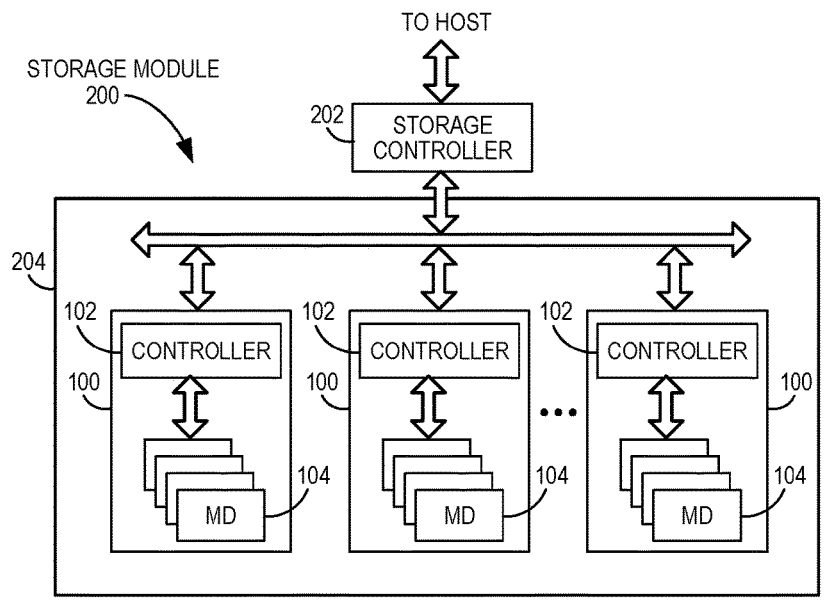
FIG. 1B is a block diagram of an example storage module that includes a plurality of memory systems.

FIG. 1B illustrates a storage module 200 that includes a plurality of non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage module 200, in one embodiment, may be a solid state drive (SSD), such as found in portable computing devices, such as laptop computers and tablet computers, and mobile phones.

Figure 1C:
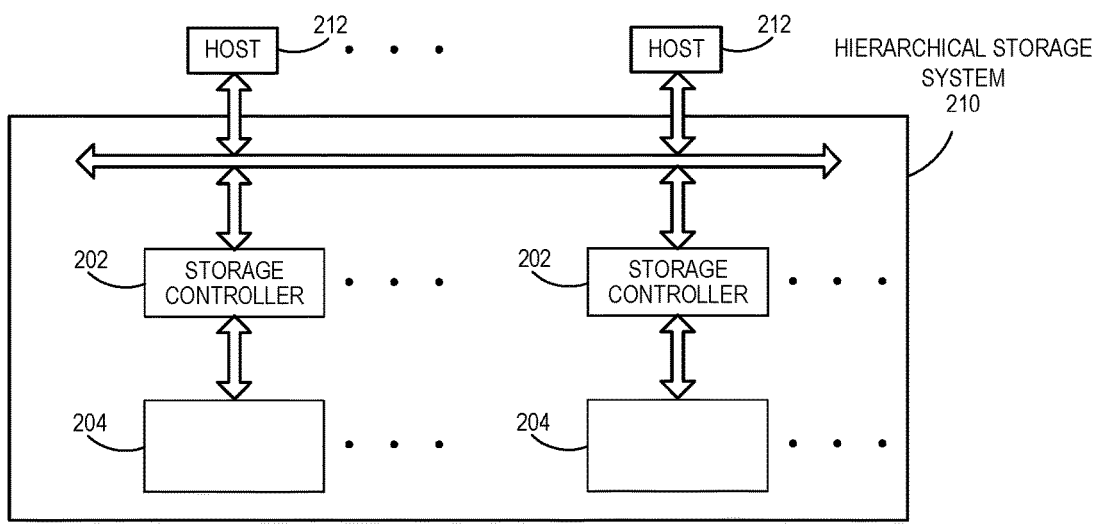
FIG. 1C is a block diagram of an example hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
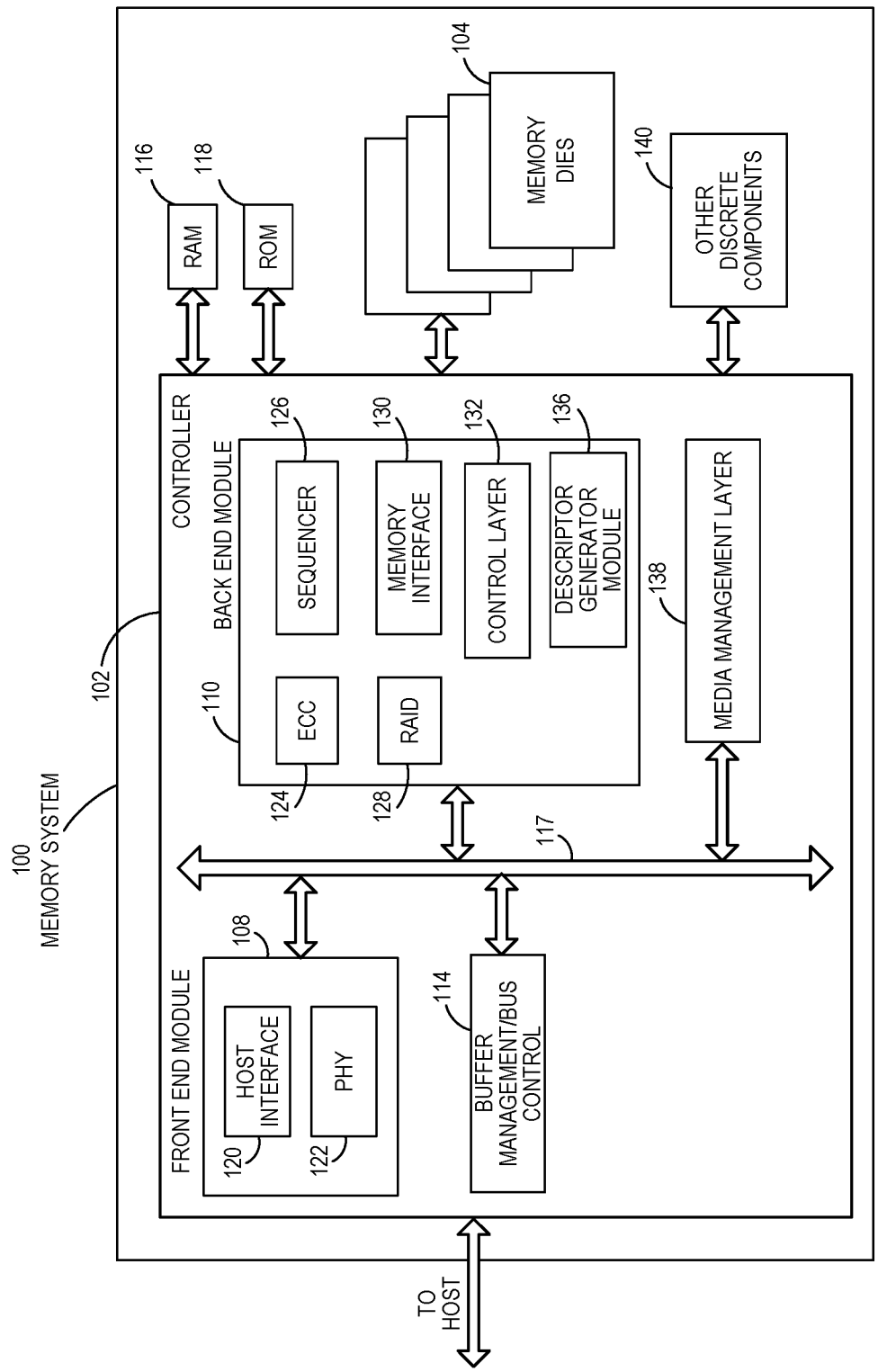
FIG. 2A is a block diagram of an example configuration of components of a controller of the memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor.

In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or next level storage controller. The choice of the type of the host interface 120 can depend on the type of memory being used. Example types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction code (ECC) module (also referred to as an ECC engine) 124 configured to perform an parity bit generation process (or an encoding process) during which the ECC module 124 generates parity bits for the data received from the host, and an error correction process (or a decoding process) during which the ECC module 124 error corrects the data bits read from the memory die(s) 104. Further operation and functionality of the ECC module 124 is described in further detail below.

The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC module 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface and/or a Toggle Mode 200, 400, 800, or higher interface. A control layer 132 may control the overall operation of back end module 110.

In addition, the back end module 110 may include a descriptor generator module 136 that is configured to generate descriptors at least for the parity bit and error correction processes performed by the ECC module 124. As described in further detail below, when data is to be written to the non-volatile memory dies 104, such as in response to a host write request, the descriptor generator module 136 may generate a descriptor associated with the data and provide the descriptor to the ECC module 124. In response to receipt of the descriptor, the ECC module 124 may retrieve the data, which may be stored in RAM 116, and encode the data prior to it being written to the non-volatile memory dies 104. In addition, when data is read from the non-volatile memory dies 104, such as in response to a host read request, the descriptor generator module 136 may generate a descriptor associated with the data and provide the descriptor to the ECC module 124. In response to receipt of the descriptor, the ECC module 124 may retrieve the data, which may be stored in RAM 116, and error correct the data prior to it being sent to its final destination, such as to the host.

Additional modules of the non-volatile memory system 100 illustrated in FIG. 2A may include a media management layer 138 that performs certain memory management functions such as wear leveling of memory cells of the memory dies 104, address management, and facilitates folding operations. Other memory management functions may be possible. The non-volatile memory system 100 may also include other discrete components 140, such as external electrical interfaces, external RAM, resistors, capacitors, or other components that may interface with the controller 102. In alternative embodiments, one or more of the RAID module 128, media management layer 138 and buffer management/bus controller 114 are optional components that may not be necessary in the controller 102.

Figure 2B:
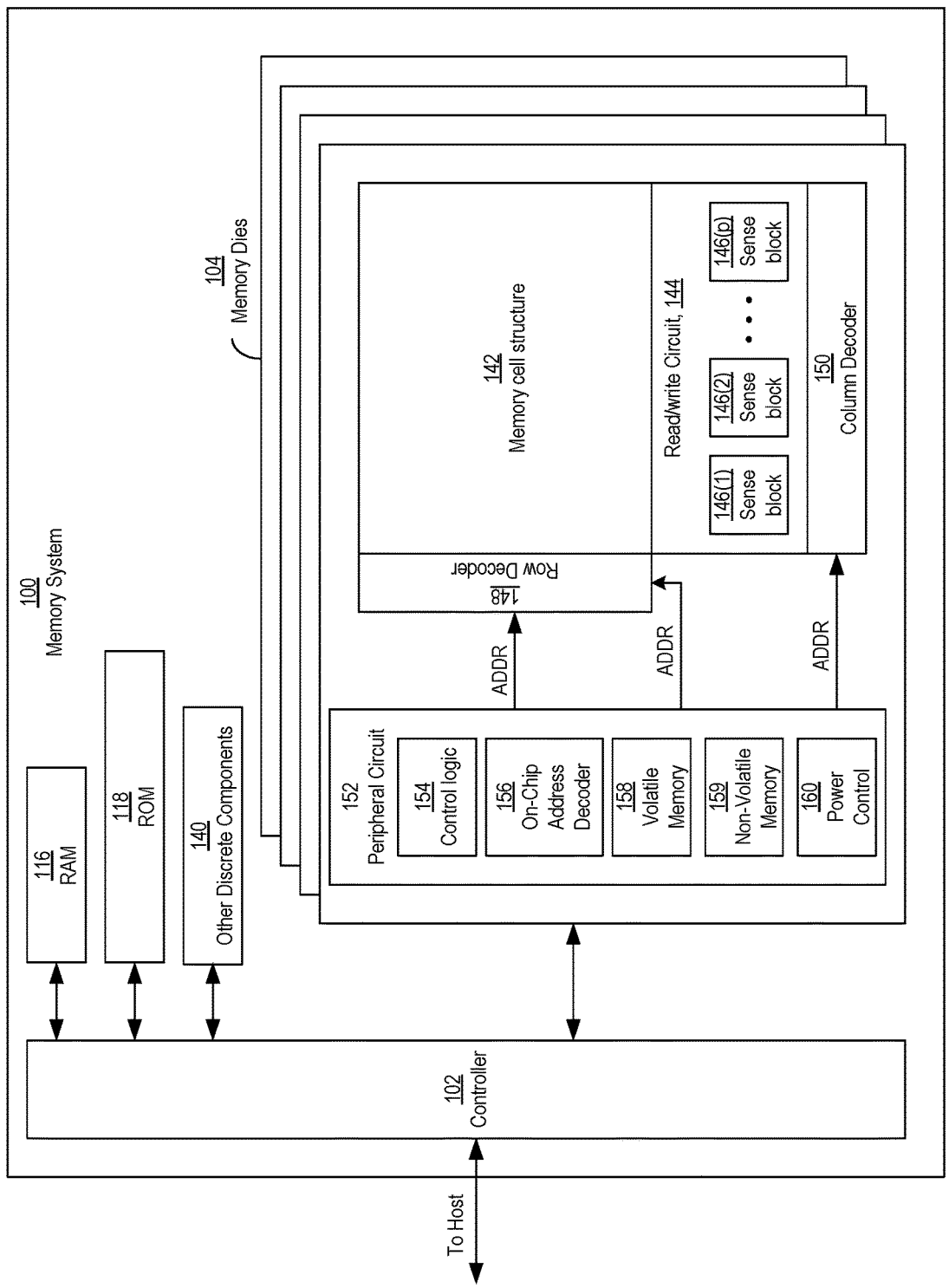
FIG. 2B is a block diagram of an example configuration of components of a memory die of the memory system of FIG. 1A.

FIG. 2B is a block diagram of an example configuration of components of a memory die 104 in more detail. The memory die 104 may include a memory cell structure 142 that includes a plurality of memory cells, otherwise or interchangeably referred to as memory elements. A memory cell is an element or component that stores a unit of data having an n-bit data value, where n is one or more. Any suitable type of memory can be used for the memory cells of the memory cell structure 142. As examples, the memory can be dynamic random access memory ("DRAM") or static random access memory ("SRAM"), non-volatile memory, such as resistive random access memory ("ReRAM"), electrically erasable programmable read only memory ("EEPROM"), flash memory (which can also be considered a subset of EEPROM), ferroelectric random access memory ("FRAM"), magnetoresistive random access memory ("MRAM"), phase-change memory ("PCM"), or other elements comprising semiconductor material or other material capable of storing information. Each type of memory may have different configurations. For example, flash memory may be configured in a NAND or a NOR configuration.

The memory can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory cells may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple cell groups, where the memory cells that are part of the same cell group share a single bias line, such as a single word line or a single bit line, and are accessed or biased as a group. Alternatively, memory cells may be configured so that each element is individually accessible, e.g., a NOR memory array. NAND and NOR memory configurations are exemplary, and memory cells may be otherwise configured.

A plurality of memory cells that form the memory cell structure 142 of a memory die may be located within and/or over a substrate. The substrate may be a wafer over or in which the layer of the memory cells are formed or it may be a carrier substrate which is attached to the memory cells after they are formed. As a non-limiting example, the substrate may include a semiconductor and/or be made of a semiconductor material, such as silicon.

In addition, a plurality of memory cells that form the entire memory cell structure 142 or at least a portion of the memory cell structure 142, may be arranged in two dimensions or in three dimensions. A plurality of memory cells arranged in two dimensions is referred to as a two-dimensional (2-D) memory cell structure. A plurality of memory cells arranged in three dimensions is referred to as a three-dimensional (3-D) memory cell structure.

In a two-dimensional memory cell structure, the memory cells are arranged in a single plane or a single memory device level. Typically, in a two-dimensional memory cell structure, the memory cells are arranged in a plane (e.g., in an x-y direction plane) that extends substantially parallel to a major surface of a substrate that supports the memory cells.

In a three-dimensional memory cell structure, the memory cells are arranged so that memory cells occupy multiple planes or multiple memory device levels (e.g., multiple x-y direction planes), thereby forming a structure in three dimensions (i.e., in the x, y and z directions, where the z direction is substantially perpendicular to and the x and y directions are substantially parallel to the major surface of the substrate). When configured as a three-dimensional memory cell structure, the memory cells extend up or away from the major surface of the substrate.

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the z direction) with each column having multiple memory cells in each column. The columns may be arranged in a two dimensional configuration, e.g., in an x-y plane, resulting in a three-dimensional arrangement of memory cells, with the memory cells on multiple vertically stacked memory planes. Other configurations of memory cells in three dimensions can also constitute a three dimensional memory array.

In at least some example configurations, a two-dimensional or a three-dimensional memory cell structure may be in the form of or configured as an ordered array (or just array). One type of an array is an orthogonal array, which is a matrix-like structure that includes rows and columns. The memory cells are arranged in the rows and columns. At the intersection of a row and a column is a memory cell. However, in other configurations, the memory cells may be arrayed in non-regular or non-orthogonal configurations.

Figure 3A:
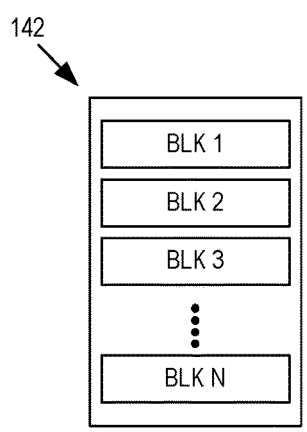
FIG. 3A is a block diagram of a memory cell structure organized into blocks.

Referring to FIG. 3A, the memory cell structure 142 located on a single memory die 104 may be organized into an N-number of blocks, extending from a first block BLK 1 to an Nth block BLK N. A block is a minimum unit of erase of a memory die 104. Memory cells that are part of the same block are erased at the same time and/or as part of a same erase operation.

Figure 3B:
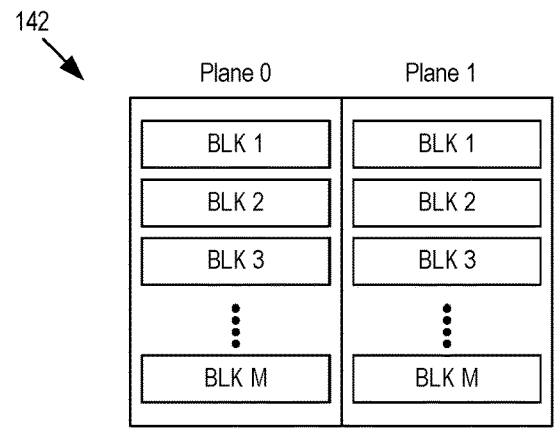
FIG. 3B is a block diagram of a memory cell structure organized into blocks in different memory planes.

Referring to FIG. 3B, for some example configurations, the N-number of blocks located on a single memory die 104 are organized into a plurality of memory planes (or just planes). FIG. 3B shows an example configuration where the blocks are organized into two memory planes, including a first memory plane Plane 0 and a second memory plane Plane 1. Configurations that include more than two memory planes may be possible. In FIG. 3B, each memory plane is shown as including an M-number of blocks, extending from a first block BLK 1 to an Mth block BLK M. In at least some example configurations, blocks that are part of the same plane may be oriented in and/or form a column or a one-dimensional array of blocks, although other configurations of blocks in a single plane may be possible.

Figure 3C:
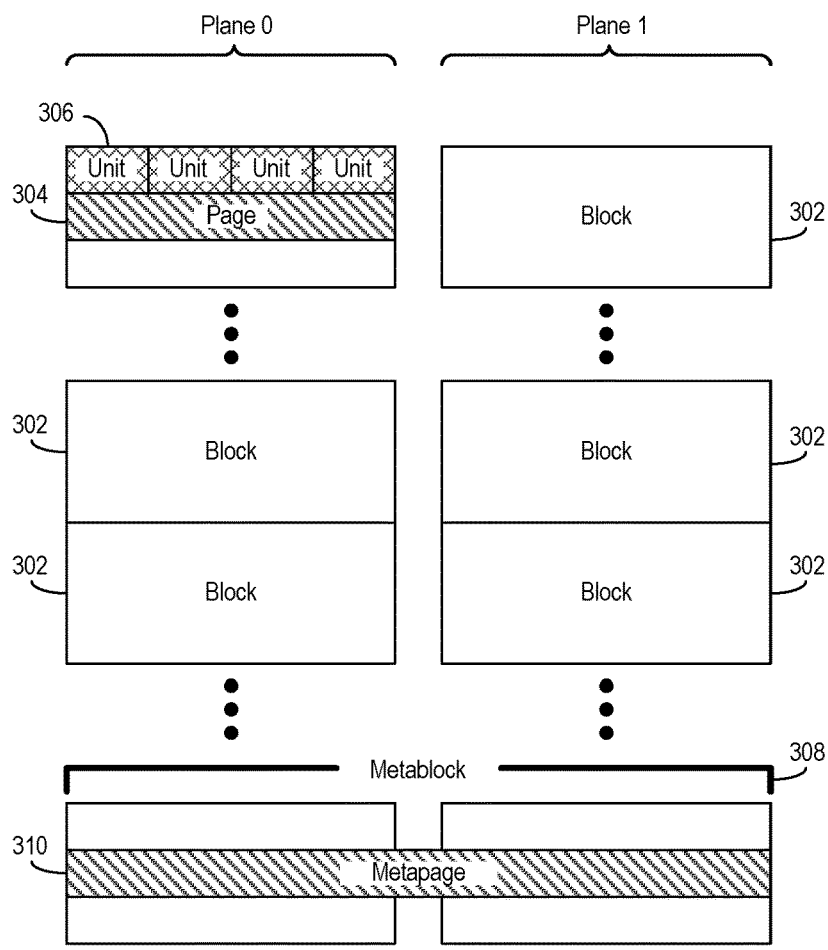
FIG. 3C is a block diagram of an example organizational arrangement or hierarchy of a memory cell structure of FIG. 2B.

Referring to FIG. 3C, a memory array structure 142 of a memory die 104, and/or a plurality of memory cell structures 142 spanning multiple memory dies 104, may have an organizational arrangement or hierarchy under which data is programmed into, read from, addressed, grouped, or identified in the memory cell structure(s) 142. The controller 102 may be configured to program data into, read data from, and manages addresses for data in accordance with the organizational arrangement or hierarchy.

FIG. 3C is a block diagram of an example organizational arrangement or hierarchy of a memory cell structure 142. As mentioned, the memory cells may be divided or organized into blocks 302 that store blocks of data. A block of data may further be divided into pages of data 304. A page 304 may be a data unit of sensing from a memory cell structure 142 and/or a unit of programming data into a memory cell structure 142. Each individual page 304 may further be divided into segments or units 306 data, with each segment or unit 306. A segment or unit 306 of data—also referred to as a flash memory unit (FMU), an ECC page, or a codeword—may include an amount of data that is written at one time during a program operation and/or an amount of data for which parity bits are generated or error corrected by the ECC module 124 during a single parity bit generation or an error correction process. Example numbers of segments or units of a page may be four or eight, although other numbers are possible.

Additionally, the organizational arrangement or hierarchy may include metablocks 408 and metapages 310. A metablock address or number identifying a metablock may be mapped to and/or correspond to a logical address (e.g., a logical group number) provided by a host. A metablock 308 and a metapage 310 may span or be distributed across a respective single block and page in a single plane, or alternatively, may span or be distributed across respective multiple blocks and multiple pages across multiple planes. FIG. 3C shows a metablock 308 and a metapage 310 spanning across two planes, Plane 0 and Plane 1. Depending on the organizational arrangement, metablocks 308 and metapages 310 spanning across multiple planes may span across only those planes of a single memory die 104, or alternatively may span across multiple planes located of multiple memory dies 104.

In addition, the memory cells of a block may be arranged two-dimensionally in a two-dimensional (2-D) memory array or three-dimensionally in a three-dimensional (3-D)

memory array. A two-dimensional block is a block that has memory cells arranged two-dimensionally. A three-dimensional block is a block that has memory cells arranged three-dimensionally.

Figure 4A:
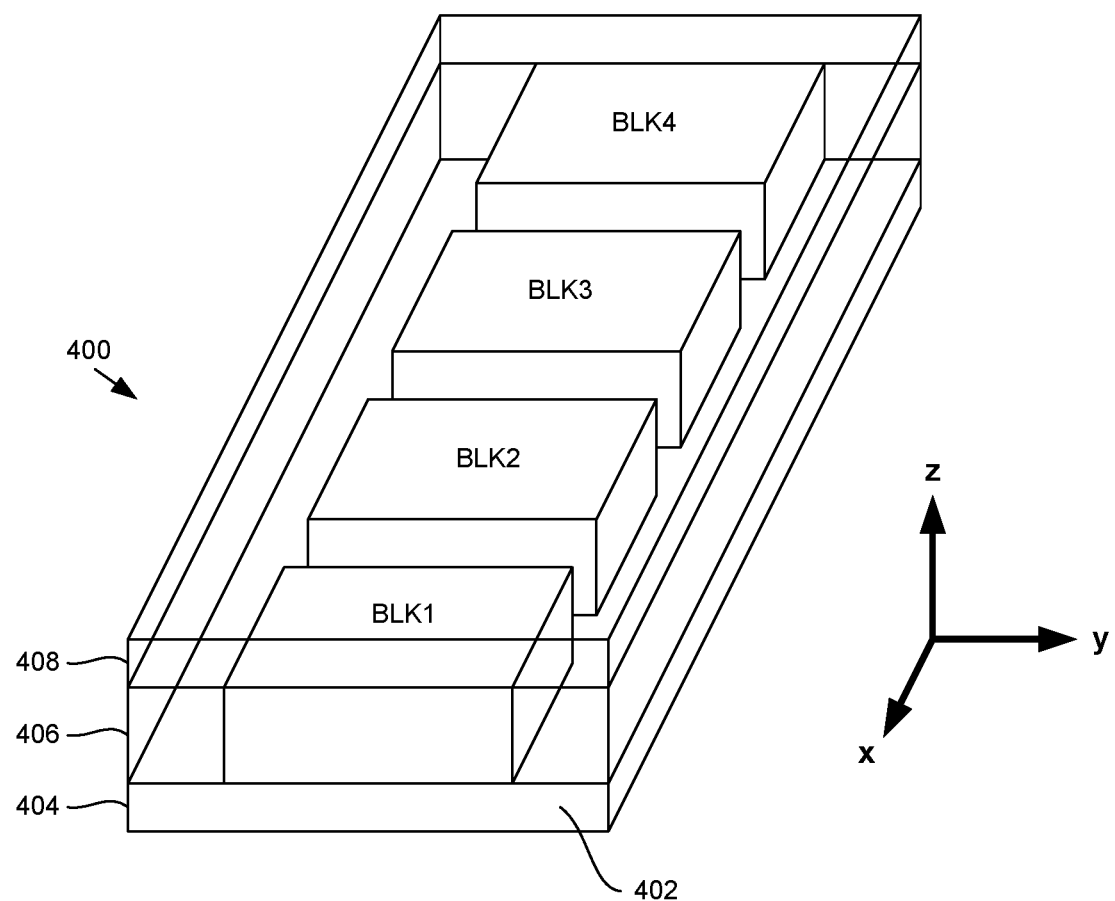
FIG. 4A is a perspective view of at least a portion of the memory die of FIG. 2B that includes a plurality of three-dimensional blocks.

FIG. 4A shows a perspective view of at least a portion of a memory die 104 that includes a set or a plurality of three-dimensional blocks 400, which may represent at least a portion of the memory cell structure 142 of FIG. 2B. For simplicity, the plurality of blocks 400 is shown as including four blocks, BLK1, BLK2, BLK3, and BLK4. In actual implementation, a given memory cell structure 142 of a memory die 104 may include several more blocks than four, such as on the order of hundreds, thousands, or tens of thousands of blocks. In a particular example configuration, one plane of blocks includes 2,000 blocks.

The blocks 400 are located or disposed on a substrate 402 of the memory die 104. The substrate 402 may be part of a lower level or region 404 of the memory die 104 that carries or includes circuitry under the blocks 400, along with one or more lower metal layers patterned to form conductive paths that carry or supply signals or voltages output from the circuitry, such as those used to perform memory operations (read, program, sense, erase, e.g.).

The blocks 400 are disposed in an intermediate level or region 406 (also referred to as a block level or region, or an array level or region) of the memory die 104 in between the lower region 404 and an upper level or region 408 of the memory die 104. The upper region 408 may include one or more upper metal layers patterned in the form of conductive paths that carry or supply signals or voltages output from the circuitry.

The substrate 402 is generally a planar structure having opposing planar surfaces. Herein, the components on a memory die 104 can be physically described with reference to a three-dimensional Cartesian coordinate system having an x-axis, a y-axis, and a z-axis. The z-axis is the axis that extends perpendicular to the planar surfaces of the substrate 402. In general, the components on a memory die 104 are disposed on and/or extend from one of the planar surfaces in a z-direction that is parallel with the z-axis. The terms "above" and "below" as well as other terms such as "top" and "bottom" and "upper" and "lower" are used herein to describe relative positioning of components of the memory die 104 along or with reference to the z-axis. For example, the blocks 400 are "above" the substrate 402, and the substrate 402 is part of the lower region 404 that is "below" the blocks 400. In addition, the upper region 408 is a region of the memory die 104 "above" both the blocks 400 and the substrate 402. Components of the memory die 104 disposed in the upper region 408 are farther away in the z-direction from the substrate 402 than components of the blocks 400. In general, for two components on a given memory die 104, where the first component is "above" the second component, the first component is positioned or disposed farther in the z-direction from the substrate 402 than the second component. In addition, where the first component is "below" the second component, the first component is positioned or disposed closer in the z-direction to the substrate 402 than the second component.

The terms "top" and "bottom" are also used to refer to the relative positioning of components of the memory die 104 in the z-direction and/or along the z-axis. In general, "bottom" components are positioned or disposed closer in the z-direction to the substrate 402 than "top" components, and "top" components are positioned or disposed farther in the z-direction from the substrate 402 than "bottom" components. In this context, a memory die 104 may include one or more top metal layers disposed in the upper region 408 and one or more bottom metal layers disposed in the lower region 404. In general, the bottom metal layers are positioned or disposed closer in the z-direction to the substrate 402 than the top metal layers, and the top metal layers are positioned or disposed farther in the z-direction from the substrate 402 than the bottom metal layers.

Although the terms "upper" and "lower," "above" and "below," and "top" and "bottom" are used to describe the relative position of components on a memory die 104, they should not be construed as limiting the relative positioning of the components since a memory die 104, or the memory system 100 as a whole, can be oriented in any of various positions.

With respect to the components of a block, a block includes a plurality of bias elements and a plurality of control lines. A bias element is a component or unit of a block that receives, is biased with, and/or that responds to a bias. A bias, as used in conjunction with a bias element of a block, is a voltage, a current, a plurality of voltages, a plurality of currents, or a combination of at least one voltage and at least one current that is applied to and/or received by the bias element to cause a response from the bias element or configure the bias element in a particular state. A bias is applied or supplied to the bias element, or the bias element is biased with the bias, at one or more levels to induce a response or configure the bias element in a particular state in order for a memory operation to be carried out.

The plurality of bias elements of a block may all be of a single type or may each be one of a plurality of different types. Bias elements of different types may perform different functions in the block and/or may be biased with different biases at different levels during the memory operations.

One type of bias element is a memory cell. Memory cells that are part of the same block are referred to as a block of memory cells. Other types of bias elements may be possible, depending on the memory technology. In NAND technology, other types of bias elements may include dummy cells, drain select gate transistors (referred to as SGD transistors), and source select gate transistors (referred to as SGS transistors). At least with NAND technology, dummy cells are memory cells that do not store data from a host, and are disposed coplanar with dummy word line layers that shield memory cells and word line layers from certain edge effects. SGD transistors and SGS transistors may be configured to be enabled (turn on) and disabled or inhibited (turn off), or otherwise configured in conductive and non-conductive states, at certain time and/or in response to certain biases to allow memory operations to be performed—e.g., to allow data to be programmed into, read from, or erased from the memory cells. Bias element types other than or in addition to memory cells, dummy cells, SGD transistors, and/or SGS transistors may be possible.

In addition, a control line of a block is a conductive structure, element, or component of a block that supplies, applies, or outputs at least a part of a bias (such as a single voltage or a single current) to one or more bias elements of a block and/or that biases the one or more bias elements with at least part of the bias. In at least some example configurations, a control line functions as a contact line, in that it is the conductive line that physically extends to and contacts the one or more bias elements it biases, such as by contacting and/or forming at least a part of the electrodes or terminals of the bias element that it biases.

The control lines of a block may be organized, arranged, characterized, divided, or configured into a plurality of different types of control lines. The control lines may be organized into types by the way that they bias the bias elements. For example, control lines of the same type may bias the bias elements in the same way, such as by biasing the same type of bias elements and/or the same types of terminals of the bias elements.

For NAND technology, the control lines of a block may be organized into three main types, including control gate lines, bit lines, and source lines. A control gate line (at least for NAND technology) is a control line that applies a control gate voltage to one or more control gate terminals (or just control gate) of one or more bias elements, and/or that biases one or more control gate terminals of one or more bias elements with a control gate voltage.

A bit line (at least for NAND technology) is a control line that applies a bit line voltage to one or more terminals of one or more bias elements, and/or that biases one or more terminals of one or more bias elements with a bit line voltage. In particular example configurations, the bit lines bias the drain terminals (or just drains) of the bias elements. For such example configurations, the bit line voltage may alternatively be referred to as a drain voltage, where a bit line is a control line that applies a drain voltage to one or more drain terminals of one or more bias elements. In addition, for at least some example configurations, a bit line biases terminals of bias elements by applying its bit line voltage to one or more channels and/or associated channel element groups. In this context, the bit line voltage may alternatively be referred to as a channel voltage, where a bit line is a control line that applies a channel voltage to one or more channels and/or associated channel element groups. Otherwise stated, a channel voltage is a voltage that a control line applies to a channel. In particular example configurations, particularly those where the bit lines bias the drain terminals of bias elements, the bit lines bias drain ends or drain sides of one or more channels and/or associated channel element groups. In this context, a bit line voltage may alternatively be referred to as a drain-side channel voltage (or just drain-side voltage). Otherwise stated, a drain-side channel voltage (or just drain-side voltage) is a voltage that a control line applies to a drain end of a channel.

A source line (at least for NAND technology) is a control line that applies a source line voltage to one or more terminals of one or more bias elements, and/or that biases one or more terminals of one or more bias elements with a source line voltage. In particular example configurations, the source line biases the source terminals (or just sources) of the bias elements. For such example configurations, the source line voltage may alternatively be referred to as a source voltage, where a source line is a control line that applies a source voltage to one or more source terminals of one or more bias elements. In addition, for at least some example configurations, a source line biases terminals of bias elements by applying its source line voltage to one or more channels and/or associated channel element groups. In this context, the source line voltage may alternatively be referred to as a channel voltage, where a source line is a control line that applies a channel voltage to one or more channels and/or associated channel element groups. In particular example configurations, particular those where the sources lines bias the source terminals of bias elements, the source line biases source ends or source sides of one or more channels and/or associated channel element groups. In this context, a source line voltage may alternatively be referred to as a source-side channel voltage or (or just source-side voltage). Otherwise stated, a source-side channel voltage (or just source-side voltage) is a voltage that a control line applies to a source end of a channel.

In at least some example configurations, control gate lines of a block may be further organized, arranged, characterized, divided, or configured into a plurality of different control gate types (or sub-types). In particular, the control gate lines may be further arranged into the types of bias elements that they bias, and include word lines, dummy word lines, drain select gate lines (referred to as SGD lines), and source select gate lines (referred to as SGS lines).

A word line is a control gate line that applies a word line voltage to one or more control gates of one or more memory cells, and/or that biases one or more control gates of one or more memory cells with a word line voltage. A dummy word line is a control gate line that applies a dummy word line voltage to one or more control gates of one or more dummy cells, and/or that biases one or more control gates of one or more dummy cells with a dummy word line voltage. A drain select gate line (referred to as an SGD line) is a control gate line that applies a drain select gate voltage (referred to as a SGD line voltage) to one or more control gates of one or more SGD transistors, and/or that biases one or more control gates of one or more SGD transistors with an SGD line voltage. A source select gate line (referred to as a SGS line) is a control gate line that applies a source select gate voltage (referred to as a SGS line voltage) to one or more control gates of one or more SGS transistors, and/or that biases one or more control gates of one or more SGS transistors with an SGS line voltage.

For some example configurations of a three-dimensional block, at least one type of control line is implemented or formed as a plurality of layers. For example, in at least some 3-D NAND configurations, the control gate lines of a block are implemented or formed as layers. In general, a layer, otherwise referred to as a sheet or a plate, is a generally planar structure extending in the x-y directions perpendicular to the z-direction. A layer has opposing planar surfaces facing in opposite directions. One of the planar surfaces is a top surface that faces in the z-direction away from the substrate 402, and the other planar surface is a bottom surface that faces in the z-direction toward the substrate 402.

Herein, the terms "line" and "layer," at least as they are used to refer to control lines—except SGD lines as described in further detail below—are used interchangeably or as alternatives to each other. For example, the terms "control gate line" and "control gate layer" are used interchangeably; the terms "word line" and "word line layer" are used interchangeably; the terms "dummy word line" and "dummy word line layer" are used interchangeably; and the terms "source select gate line" (or SGS line) and "source select gate layer" (or SGS layer) are used interchangeably.

In addition, for at least for some example configurations of 3-D NAND technology, a three-dimensional block includes a stack. In general, a stack is a plurality or a collection of layers disposed on top of one another. For 3-D NAND, a stack of a block includes a plurality of control gate layers and a plurality of dielectric layers. A dielectric layer, at least when implemented with control gate layers of a stack, is a layer that electrically isolates one control gate layer from another control gate layer. In the stack, the control gate layers and the dielectric layers are arranged in an alternating manner, in that as the stack extends in the z-direction away from the substrate, the layers consecutively alternate between control gate layers and dielectric layers. In this context, a stack of a three-dimensional block is a collection of alternatingly disposed control gate layers and dielectric layers.

A stack of a three-dimensional block includes outer surfaces and edges as defined by the side surfaces and edges of the layers, as well as a top surface of a top-most layer of the stack and a bottom surface of a bottom-most layer of the stack. The outer surfaces and edges of the stack, in turn, define an outer boundary of the stack. The bias elements of the three-dimensional block are three-dimensionally arranged within the outer boundary. In this context, the bias elements of the three-dimensional block are referred to as being disposed in or within the stack.

In addition, at least for some example configurations, the bias elements of a three-dimensional block are disposed coplanar (in the x-y direction) with control gate layers. In particular, the bias elements are coplanar with the control gate layers by which they are configured to be biased. Accordingly, memory cells configured to be biased by a particular word line layer are disposed coplanar with the particular word line layer; SGD transistors configured to be biased by a particular SGD layer are disposed coplanar with the particular SGD layer; SGS transistors configured to be biased by a particular SGS layer are disposed coplanar with the particular SGS layer; and dummy cells configured to by biased by a particular dummy word line layer are disposed coplanar with the particular dummy word line layer.

A bias element that is coplanar with and/or configured to be biased by a given control gate layer may be referred to as being disposed in, located in, and/or coupled to the given control gate layer. For example, a memory cell coplanar with and/or configured to be biased by a given word line may be referred to as being disposed in, located in, and/or coupled to the given word line layer.

In addition, at least for some example configurations of 3-D NAND technology, a three-dimensional block includes a plurality of channels. A channel is an elongate structure that extends in the z-direction through a stack of a block, around or about which bias elements of the block are formed or disposed. A bias element that is disposed or formed around or about a channel may at least partially, and in some configurations completely, encompass or surround the channel.

In addition, at least for some example configurations of 3-D NAND technology, bias elements of a block are biased by way of channels. Otherwise stated, a channel is structure of a block by which bias elements are biased. In particular, drain terminals and source terminals of bias elements are biased by way of channels. A bias element that has its source and drain terminals biased by a given channel is coupled to that given channel.

Each channel includes a respective drain end (or drain side) and a respective source end (or source side). A channel extends through a stack in the z-direction toward the substrate from its drain end to its source end. Bit lines of a block are electrically connected or coupled the drain ends of the channels, and the source line of a block is electrically connected or coupled to the source ends of the channels. In the example configurations of a block described herein, a bit line applies a bit line voltage (or drain voltage or drain-side voltage or drain-side channel voltage) to the one or more drain ends of one or more channels to which it is coupled. The source line applies a source line voltage (or source voltage or source-side voltage or source-side channel voltage) to the source ends of the channels to which it is coupled.

Additionally, as used herein, a channel element group is a plurality or a collection of bias elements that are formed or disposed around or about the same channel. A given channel and a given channel element group that includes the bias elements disposed or formed around or about the given channel are referred to as being coupled to and/or associated with each other. In addition, bias elements that are part of the same channel element group are referred as being coupled to each other.

For at least some example configurations, the bias elements of a channel element group include a plurality of memory cells, at least one SGD transistor, and at least one SGS transistor. In particular example configurations, a channel element group may further include one or more dummy cells.

The channel element groups extend in the z-direction about their associated channels. Similar to the channels, the channel element groups each include respective drain ends (or drain sides) and source ends (or source sides). A channel extends in the z-direction toward the substrate from its drain end to its source end.

In particular example configurations, including those described herein, drain ends of channel element groups are electrically coupled to drain ends of their associated channels. Accordingly, the bit lines are electrically connected or coupled to drain ends of channels and associated channel elements groups. In this context, a bit line or channel voltage that a bit line is configured to apply is a drain voltage, a drain-side channel voltage, or a drain-side voltage that the bit line applies to drain ends of channels and associated channel element groups to which the bit line is coupled. Otherwise stated, a drain-side channel voltage (or drain-side voltage) is a voltage that a bit line generates and applies to a drain end (or drain side) of a channel and/or a drain end (or drain side) of a channel element group to which it is electrically connected or coupled. During at least some example memory operations, a bit line may bias one or more drain terminals of one or more bias elements by applying a bit line voltage (or a drain voltage, a drain-side channel voltage, or a drain-side voltage) to one or more drain ends of one or more channels and/or to one or more drain ends of one or more channel element groups to which it the bit line is electrically connected or coupled. Otherwise stated, during at least some example memory operations, a bit line biases one or more drain terminals of one or more bias elements with a bit line voltage (or a drain voltage, a drain-side channel voltage, or a drain-side voltage) by way of the drain ends of one or more channels and/or the drain ends of one or more channel element groups to which the bit line is coupled.

Similarly, in particular example configurations, including those described herein, source ends of channel element groups are electrically coupled to source ends of their associated channels. Accordingly, the source line is electrically connected or coupled to source ends of channels and associated channel elements groups. In this context, a source line or channel voltage that a source line is configured to apply is a source voltage, a source-side channel voltage, or a source-side voltage that the source line applies to source ends of channels and associated channel element groups to which the source line is coupled. Otherwise stated, a source-side channel voltage (or source-side voltage) is a voltage that a source line generates and that it applies to a source end (or source side) of a channel and/or a source end (or source side) of a channel element group to which the source line is electrically connected or coupled. During at least some example memory operations, a source line may bias one or more source terminals of one or more bias elements by applying a source line voltage (or a source voltage, a source-side channel voltage, or a source-side voltage) to one or more source ends of one or more channels and/or to one or more source ends of one or more channel element groups to which it the source line is electrically connected or coupled. Otherwise stated, during at least some example memory operations, a source line biases one or more source terminals of one or more bias elements with a source line voltage (or a source voltage, a source-side channel voltage, or a source-side voltage) by way of the source ends of one or more channels and/or the source ends of one or more channel element groups to which the source line is coupled.

In addition, bias elements of a channel element group extend in the z-direction around or about the same channel. Each bias element of the channel element group is disposed coplanar with one of the plurality of control gate layers of the block. In this regard, each control gate layer of the block is configured to bias a control gate of a respective one of the plurality of bias elements of the channel element group.

In addition, for at least some example configurations, the channel element groups of a block may have the same number of bias elements, the same combination of bias element types, and the same number of bias elements of each bias element type. Also, a bias element order in which the bias elements of their respective bias element types extend in the z-direction away from the substrate is the same among the channel element groups of a block. At least for some example configurations of 3-D NAND technology, the bias element order of the bias elements of a channel element group, starting closest to the substrate and moving away from the substrate in the z-direction, includes one or more SGS transistors followed by one or more source-side dummy cells, followed by a plurality of memory cells, followed by one or more drain-side dummy cells, and followed by one or more SGD transistors. Other bias element orders may be possible.

A control gate layer order of the control gate layers and their respective types may match or correspond to the bias element order of a block. Accordingly, at least for some example configurations of 3-D NAND technology, a control gate layer order of a plurality of control gate layers of a block, starting closest to the substrate and moving away from the substrate in the z-direction, includes one or more SGS layers, followed by one or more source-side dummy word line layers, followed by a plurality of word line layers, followed by one or more drain-side dummy word line layers, and followed by one or more SGD layers.

Figure 4B:
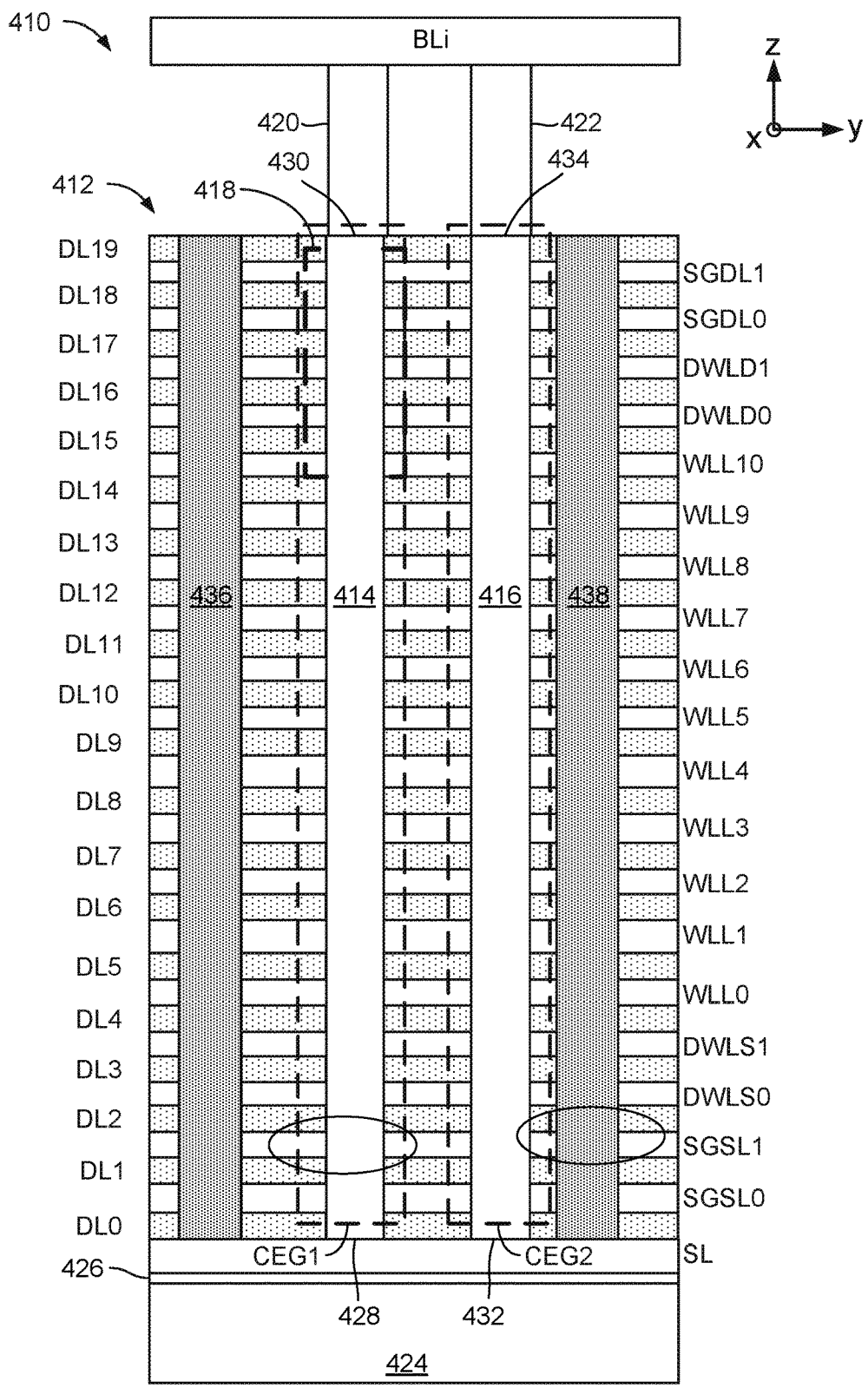
FIG. 4B is a cross-sectional view of a portion of one of the blocks of FIG. 4A.

In further detail, FIG. 4B shows a cross-sectional view of a portion of a block 410, which may be representative of one of the blocks 400 of FIG. 4A. The block 410 includes a stack 412 of alternating control gate layers and dielectric layers (DL). In addition, the portion shown in FIG. 4B includes two channels (or memory holes) extending through the layers, including a first channel 414 and a second channel 416. Bias elements forming two memory channel element groups around the two channels 414, 416 are identified by dotted boxes in FIG. 4B. In particular, bias elements forming a first channel element group CEG1 around the first channel 414 are identified by a dotted box labeled CEG1, and bias elements forming a second channel element group CEG2 around the second memory hole 416 are identified by a dotted box labeled CEG2. Further details of bias elements and example materials to form the elements and the channels are described in further detail below with respect to FIG. 4C with reference to a particular region 418 of the first channel element group CEG1 and associated first channel 414.

For purposes of illustration, in FIG. 4B, the first and second channel element groups CEG1, CEG2 formed around the first and second channels 414, 416 are both electrically connected to an ith bit line BLi. In actual implementation, a block may include hundreds or thousands of bit lines. An arrangement of channels and associated channel element groups of a block may determine which channels and channel element groups are electrically connected to which bit lines. Among the plurality of channels and channel element groups of a block, certain combinations of channels and associated channel element groups are electrically connected to the same bit line as each other, while certain other combinations of channels and associated channel element groups are electrically connected to different bit lines from each other.

In addition, a given channel element group may be electrically connected to a given bit line by way of its associated channel and a conductive via electrically connecting the associated channel with the bit line. For example, in FIG. 4B, the first channel element group CEG1 is electrically connected to the ith bit line BLi by way of the first channel 414 and a conductive via 420 that electrically connects the first channel 414 with the ith bit line BLi. The second channel element group CEG2 is electrically connected to the ith bit line BLi by way of the second channel 416 and a conductive via 422 that electrically connects the second channel 416 with the ith bit line BLi. Other ways of electrically connecting bit lines with channel element groups may be possible.

The block 410 may further include or be disposed on a substrate 424. An insulating film 426 may be formed on the substrate 424, and a source line SL may be formed or disposed on a bottom-most layer of the stack 412.

In addition, in the example configuration shown in FIG. 4B, each channel 414, 416 includes a source end connected to the source line SL, and a drain end connected to its associated conductive via. In FIG. 4B, the first channel 414 includes a source end 428 connected to the source line SL, and a drain end 430 connected to the conductive via 420. Similarly, the second channel 416 includes a source end 432 connected to the source line SL, and a drain end 434 connected to the conductive via 422.

In addition, at least some example configurations, the block 410 may further include vertical interconnects (e.g., metal-filled slits) extending through the stack 412 that connect the source line SL to a conductive line above the stack 412, such as a conductive line in one of the metal layers in the upper region 408 (FIG. 4A). For purposes of illustration, FIG. 4B shows two interconnects 436, 438 extending through the stack 412.

In addition, in the example configuration in FIG. 4B, for purposes of illustration, each of the channel element groups include two SGS transistors, two source-side dummy cells, eleven memory cells, two drain-side dummy cells, and two SGD transistors. Accordingly, the control gate layers of the stack 412 include: two SGS layers, including a first SGS layer SGSL0 and a second SGS layer SGSL1; two source-side dummy word line layers, including a first source-side dummy word line layer DWLS0 and a second source-side dummy word line layer DWLS1; eleven word line layers extending from a first word line layer WLL0 to an eleventh word line layer WLL10; two drain-side dummy word line layers, including a first drain-side dummy word line layer DWLD0 and a second drain-side dummy word line layer DWLD1; and two SGD layers, including a first SGD layer SGSL0 and a second SGD layer SGDL1. The stack further includes twenty dielectric layers, extending from a first dielectric layer DL0 to a twentieth dielectric layer DL19, alternatingly disposed between the control gate layers.

The numbers of bias elements and their respective bias element types used for the channel element groups and the number of corresponding control gate layers in the example configuration of the block 410 in FIG. 4B are non-limiting and merely exemplary for purposes of illustration. Other numbers of bias elements for any of the bias element types, or other configurations that do not include bias elements of certain bias elements types or that include one or more bias elements of bias element types other than those shown in FIG. 4B, may be possible.

Figure 4C:
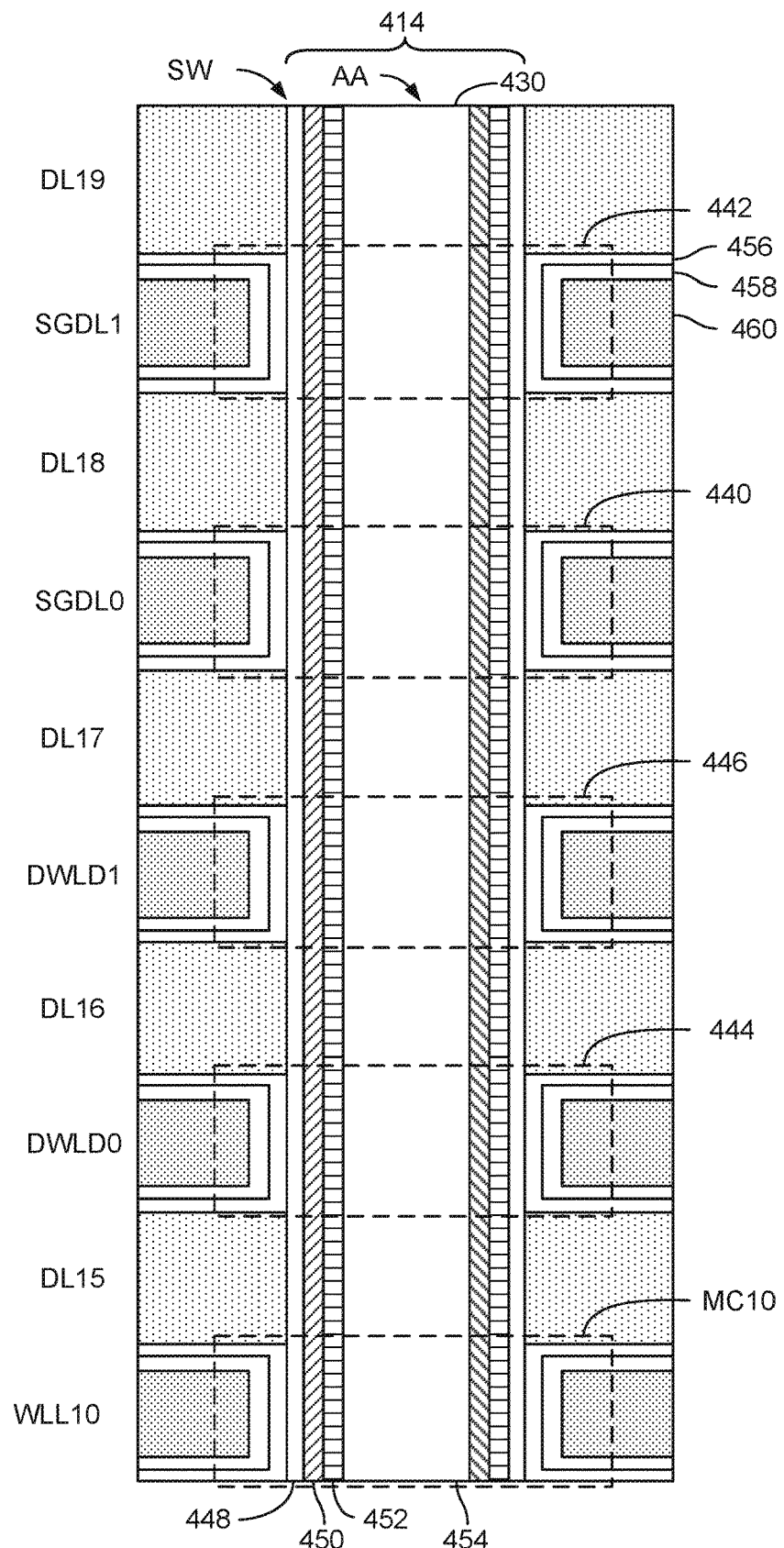
FIG. 4C is a close-up view of a region of the cross-section of FIG. 4B.

FIG. 4C is a close-up view of the region 418 of the block 410 of FIG. 4B. The materials forming the bias elements are formed at different levels of the stack 412 at the intersection of respective control gate layers and respective channels. In the example configuration of the block 410, as depicted in the close-up view of FIG. 4C, a first SGD transistor 440 and a second SGD transistor 442 are disposed below the drain end 430 of the first channel 414, and above first and second drain-side dummy cells 444, 446 and an eleventh memory cell MC10.

Physically or structurally, a channel includes a memory hole extending in the z-direction defined by a sidewall (SW). A channel further includes one or more layers of materials disposed in the memory hole and/or on the side wall, such as by using atomic layer deposition as an example. In some example configurations, as described with respect to the first channel 414, the layers of materials of a channel (which may be referred to as a column or a pillar of materials) may include a charge-trapping layer or film 448 such as silicon nitride, a tunneling layer 450, a polysilicon body or channel 452, and a dielectric core 454. In addition, in some example configurations, such as the one shown in FIG. 4C, the materials making up each of the bias elements may include a blocking oxide/block high-k material 456, a barrier metal 458, and a conductive metal 460 (e.g. Tungsten) that forms the control gates of the transistors. The materials forming the bias elements may be disposed in the same level or in the same plane as the respective control gate layers. Other configurations may use materials deposited along the sidewall (SW) and/or for the bias elements other than those shown and described with reference to FIG. 4C.

Figure 4D:
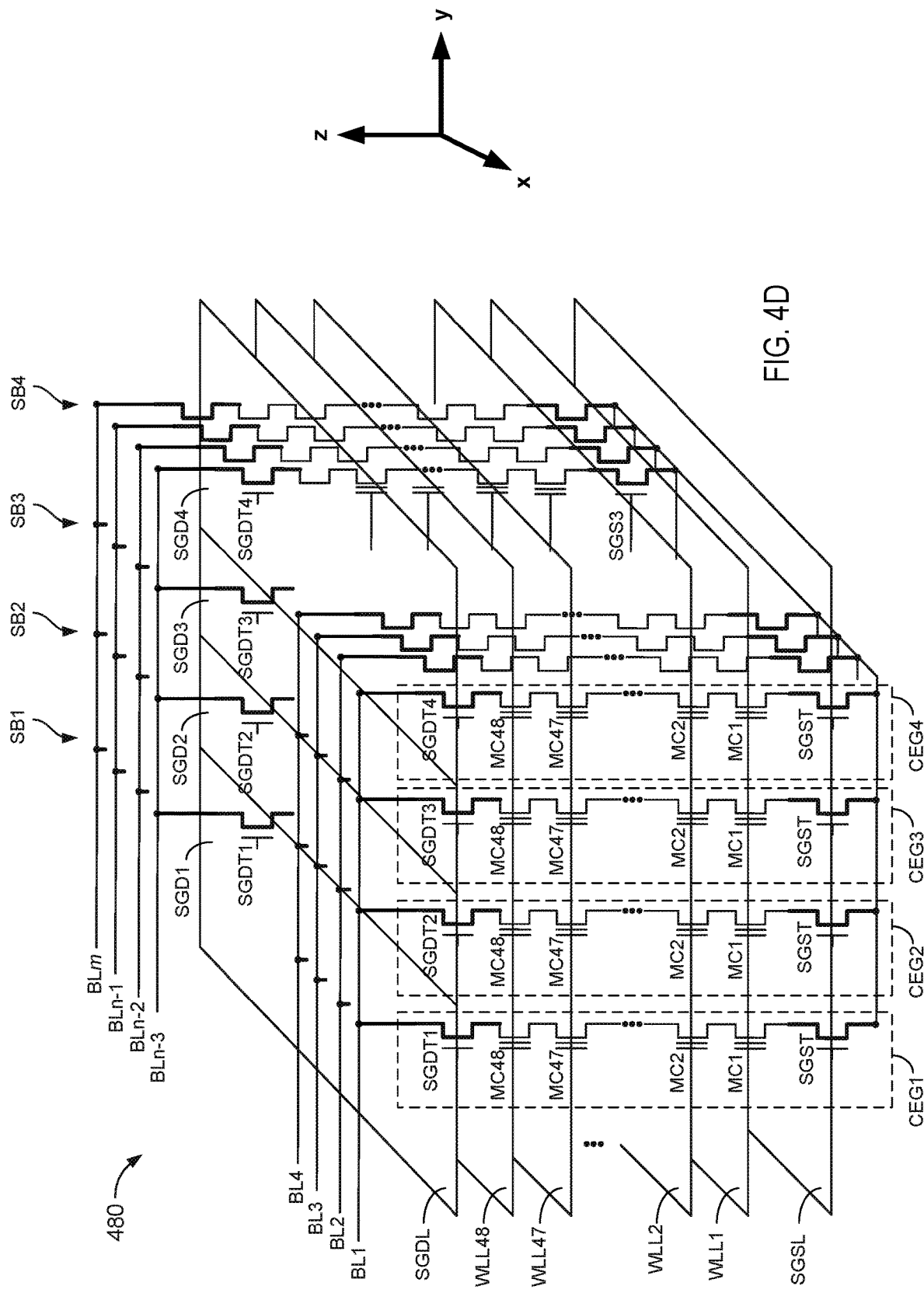
FIG. 4D is a circuit schematic diagram of a block of memory cells three-dimensionally arranged into a plurality of NAND strings.

FIG. 4D shows a circuit schematic diagram of an example configuration of a three-dimensional block 480, which may be representative of at least a portion of one of the blocks 400 of FIG. 4A and/or have the physical construction or structure as depicted in FIGS. 4B, 4C. In FIG. 4D, each bias element is represented or depicted as a transistor. In addition, memory cells are labeled MC, SGD transistors are labeled SGDT, and SGS transistors are labeled SGST. In the example block 480, each channel element group (e.g., CEG1) includes 50 cells, including 48 memory cells, extending from a first memory cell MC1 to a 48th memory cell MC48, one SGD transistor SGDT, and one SGS transistor SGST. Other channel element group configurations are possible, including those that include one or more source-side dummy cells, one or more drain-side dummy cells, more than one SGD transistor, and/or more than one SGS transistor, as previously described.

In accordance with the channel element group configuration in FIG. 4B, the block 480 includes 50 control gate layers, including 48 word line layers extending from a first word line layer WLL1 to a 48th word line layer WLL48, a SGD layer SGDL, and a SGS layer SGSL. As previously described, the ith memory cells MCi in each channel element group are disposed in and configured to have their respective control gates biased by the ith word line layer WLLi of the control gate layers. As examples, first memory cells MC1 of the channel element groups CEG are disposed in and configured to have their control gates biased by the first word line layer WLL1, the second memory cells MC2 are disposed in and configured to have their control gates biased by the second word line layer WLL2, and the 48th memory cells MC48 of the channel element groups CEG are disposed in and configured to have their control gates biased by the 48th word line layer WLL48. In addition, the SGD transistors of the channel element groups are disposed in and configured to have their respective control gates biased by the SGD layer SGDL, and the SGS transistors of the channel element groups are disposed in and configured to have their respective control gates biased by the SGS layer SGSL.

As depicted in FIG. 4D, the channel element groups CEG and their associated channels are two-dimensionally arranged in the x and y directions in the block 480, and electrically connected to an m-number of bit lines. In particular example configurations, the channel element groups CEG and their associated channels are two-dimensionally arranged in accordance with a channel arrangement that depends on a P-number of channel element groups and their associated channels that are connected to a single bit line. Otherwise stated, each bit line BL is configured to electrically connect to, apply a respective bit line voltage to, and/or bias with a respective bit line (channel) voltage, a unique set of a P-number of channel element groups and their associated channels.

In the example configuration of FIG. 4D, each bit line BL is configured to electrically connected to four channel element groups (i.e., P=4). Accordingly, FIG. 4D shows the first bit line BL1 electrically connected to each of a first channel element group CEG1, a second channel element group CEG2, a third channel element group CEG3, and a fourth channel element group CEG4. Each of the other two through mth bit lines BL2 to BLm are also electrically connected to a respective set of four channel element groups and their respective channels. Numbers for P other than four may be possible for various other configurations.

In addition, for some example embodiments, the memory system 100 may group the m-number of bit lines BL1 to BLm into groups of bit lines. A bit line group, also referred to as a bit line column, is a collection or a plurality of bit lines recognized or identified collectively in the memory system 100. The bit lines of a bit line group may be part of a same block. In particular example embodiments, the bit lines of a bit line group are adjacent bit lines. Grouping the bit lines into bit line groups or columns may reduce the complexity of addressing the storage locations of the memory cell structure 142 in that a column address over a page may be identified on the basis of groups of bit lines, rather than on a bit line-by-bit line basis. In one example, a block may include 16,000 bit lines (i.e., m=16,000), and every sixteen bit lines BL are grouped together in a bit line group or column. Grouping the 16,000 bit lines BLs into bit line groups or columns of sixteen may yield only 1,000 column addresses over a page, rather than 16,000 column addresses.

In addition, in some example configurations, an SGD layer may be separated or divided into a plurality of different drain select gate (SGD) sub-layers that are electrically isolated or disconnected from each other. For example, an SGD layer may be etched to remove portions of the metal forming the SGD layer in order to form a plurality of electrically isolated or disconnected SGD sub-layers.

Different SGD sub-layers of the same SGD layer may be independently and/or individually biased and/or supplied with a different one of a plurality of SGD line voltages. In turn, for a given plurality of SGD transistors disposed in the same SGD layer, each SGD sub-layer of the same SGD layer may be configured to bias the control gates of those SGD transistors disposed in its SGD sub-layer, but not the SGD transistors disposed in the other SGD sub-layers. In this way, the plurality of SGD sub-layers may be configured to independently or individually bias the different SGD transistors within their respective SGD sub-layers with a respective one of a plurality of SGD line voltages.

In addition, for example configurations that include multiple SGD layers, each SGD layer may include multiple SGD sub-layers. The number of SGD sub-layers in each SGD layer may be the same. In addition, certain combinations of SGD-sub-layers in different SGD layers may be electrically coupled together and/or supplied with the same SGD line voltage such that SGD transistors of the same channel element group have their control gates biased with the same SGD line voltage. SGD sub-layers that bias SGD transistors with the same SGD line voltage form part of the same SGD line.

As used herein, an SGD line is a conductive structure of a block that biases control gates of SGD transistors with a common or the same SGD line voltage. Accordingly, as used specifically herein for SGD layers and SGD lines, the terms "line" and "layer" are not used interchangeably. Instead, an SGD line is a single SGD sub-layer, or a collection of SGD sub-layers each part of a different SGD layer. In particular, for 3-D block configurations that include a single SGD layer, each SGD sub-layer of the SGD layer forms an entire SGD line. For 3-D block configurations that include multiple SGD layers, each SGD sub-layer forms a part of an SGD line with one or more other SGD sub-layers from one or more other SGD layers.

In addition, different SGD lines are configured to independently or separately bias different sets or groups of SGD transistors of a block with different SGD line voltages. An SGD line is configured to bias the control gates of those SGD transistors to which it is coupled or electrically connected, and not bias the control gates of those SGD transistors from which it is uncoupled or electrically disconnected. Accordingly, the SGD transistors SGDT of a block are arranged or formed into a plurality of SGDT groups. SGD transistors that are part of the same SGDT group are coupled to the same SGD line and configured to be biased by the same SGD line voltage. SGD transistors that are part of different SGDT groups are coupled to different SGD lines and configured to be biased by different SGD line voltages.

In addition, for at least some example configurations of a 3-D block, the number of SGD lines is equal to the P-number of channel element groups and associated channels that are connected to the same bit line. For example, with reference to FIG. 4D, the block 480 includes four SGD lines corresponding to the four channel element groups connected to a single bit line, including a first SGD line SGD1, a second SGD line SGD2, a third SGD line SGD3, and a fourth SGD line SGD4. Otherwise stated, the SGD layer SGDL includes four SGD lines SGD1, SGD2, SGD3, and SGD4.

In addition, the channel element groups may be arranged so that for a given set of channel element groups connected to the same bit line, each channel element group of the set has its SGD transistor SGDT coupled to a different one of the SGD lines. For example, in the block 480 of FIG. 4D, the set of four channel element groups CEG1, CEG2, CEG3, CEG4 connected to the first bit line BL1 have their respective SGD transistors connected to a different one the SGD lines SGD1, SGD2, SGD3, SGD4. In particular, the first channel element group CEG1 includes an SGD transistor SGDT1 coupled to and configured to have its control gate biased by the first SGD line SGD1, the second channel element group CEG2 includes an SGD transistor SGDT2 coupled to and configured to have its control gate biased by the second SGD line SGD2, the third channel element group CEG3 includes an SGD transistor SGDT3 coupled to and configured to have its control gate biased by the third SGD line SGD3, and the fourth channel element group CEG4 includes an SGD transistor SGDT4 coupled to and configured to have its control gate biased by the fourth SGD line SGD4.

A 3-D block may be arranged, organized, or divided into sub-blocks across the m-number of word lines based on the different SGD lines. As used herein, a sub-block is a portion of a block that has channel element groups with SGD transistors configured to be biased by the same SGD line and/or with the same SGD line voltage. A sub-block may span, such as in the x-direction, across the m-number of word lines of a block. In addition, channel element groups with SGD transistors configured to be biased by different SGD lines and/or with different SGD line voltages are part of different sub-blocks.

The number of sub-blocks of a block may be equal to the number of SGD lines. For example, the example block 480 of FIG. 4D includes four sub-blocks (SB) equal to the number of SGD lines, including a first sub-block SB1, a second sub-block SB2, a third sub-block SB3, and a fourth sub-block SB4. The first sub-block SB1 includes those channel element groups with SGD transistors SGD1 coupled to the first SGD line SGD1 and configured to be biased with a first SGD line voltage, the second sub-block SB2 includes those channel element groups with SGD cells SGD2 coupled to the second SGD line and configured to be biased with a second SGD line voltage, the third sub-block SB3 includes those channel element groups with SGD cells SGD3 coupled to the third SGD line and configured to be biased with a third SGD line voltage, and the fourth sub-block SB4 includes those channel element groups with SGD cells SGD4 coupled to the fourth SGD line and configured to be biased with a fourth SGD line voltage.

In addition, a block of memory cells (i.e., memory cells that are part of the same block), may be arranged, organized, separated, and/or labeled on a sub-block level, or on both a sub-block level and a word line level. A plurality of memory cells MC that are part of the same sub-block is referred to as a sub-block of memory cells. Otherwise stated, a sub-block of memory cells are memory cells of channel element groups having SGD cells coupled to the same SGD line and/or configured to be biased with the same SGD line voltage.

In addition, a plurality of memory cells that are part of the same sub-block, and that are also disposed in the same word line layer and/or that are configured to have their control gates biased by the same word line and/or with the same word line voltage are referred to as a word line cell group or a string of memory cells. Otherwise stated, a word line cell group (or string) of memory cells is a plurality or a collection of memory cells coupled to the same word line layer, and that are part of channel element groups configured to be biased with the same SGD line voltage.

A single word line layer may include a plurality of word line cell groups, such that the memory cells disposed in a single word line layer are organized, arranged, or disposed into a plurality of word line cell groups (or strings). Memory cells coupled to the same word line layer but that are part of channel element groups having SGD transistors coupled to different SGD lines are part of different word line cell groups. In particular example configurations, the number of word line cell groups coupled to a single word line layer is equal to the number of SGD lines of a block. In addition, the number of memory cells of a single word line cell group may be equal to the m-number of bit lines BL1 to BLm, such that each memory cell of a word line cell group is electrically connected to a different one of the m-number of bit lines BL1 to BLm.

In addition, the memory cells of a block, or of the memory cell structure 142 generally, are configured to store data as bits or binary digits, with each bit having either a logic 0 or a logic 1 binary value. A single memory cell may be configured to store either a single bit or a plurality of bits. A bit or bits that a single memory cell stores is referred to as a data value. Otherwise stated, a data value is an n-bit binary value that a single memory cell stores, where n is the number of bits of the binary value, and where the number n is one or more. The number of possible data values that a single memory cell can store depends on the n-number of bits it is configured to store. In particular, the number of possible data values a single memory cell can store is $2^n$.

Memory cells may be referred to as single-level cells or multi-level cells depending on the number of bits they are configured to store. A single-level cell, referred to as a SLC cell (or just SLC), is a memory cell configured to store a single or one bit of data. A multi-level cell, referred to as a MLC cell (or just MLC), is a memory cell configured to store multiple (i.e., two or more) bits of data. Example numbers of bits that an MLC cell can store include 2, 3, or 4, although MLC cells that store more than 4 bits may be possible.

In general, certain collections of memory cells are configured to store the same number of bits. For example, memory cells that are part of the same word line cell group, part of the same block, or part of the same memory cell structure 142, are configured to store the same number of bits. In this context, a given collection of memory cells (e.g., memory cells of the same word line cell group, the same block, the same memory cell structure, etc.) stores data on a bits-per-cell basis. Each memory cell of the given collection stores the same number of bits-per-cell.

In addition, a memory cell structure 142, including blocks and word line cell groups of the memory cell structure 142, may store data as pages. Herein, a page is a single unit of data that a single word line cell group of memory cells stores. The number of pages that a single word line cell group stores depends on the number of bits-per-cell that the memory cells of the single word line cell group are configured to store. As examples, a word line cell group of SLC cells is configured to store a single or one page of data; a word line cell group of MLC cells configured to store two-bits-per-cell is configured to store two pages of data; and a word line cell group of MLC cells configured to store three-bits-per-cell is configured to store three pages of data.

In addition, a memory cell structure 142 may store data according to one or more storage schemes. As used herein, a storage scheme is a general plan including a predefined set of actions and a predefined set of parameters that a memory system implements to store data. A given storage scheme for a particular collection of memory cells may identify or define the number of bits-per-cell that the memory cells of the particular collection are configured to store. The components of the memory system, including the circuit components on a given memory die, are configured to perform memory operations on the particular collection in accordance with the given storage scheme in order to program data into and/or read data from the particular collection of memory cells.

Memory cells of different memory technologies may store data in accordance with different storages schemes. In addition, memory cells of the same memory technology may store data in accordance with different storage schemes. For example, memory cells of the same memory technology but located in different memory systems, or in the same memory system but in different memory dies, or in different blocks or planes of the same memory die, or even different word line layers or different word line cell groups of the same block, may store data in accordance with different storage schemes, at least with respect to the number of bits-per-cell the different memory cells are configured to store.

At least for NAND memory technology, the NAND memory cells may be configured to store data in accordance with one of multiple different storage schemes, with each storage scheme associated or identifying a different number of bits-per-cell. In at least some example configurations, some NAND memory cells may store data according to one storage scheme while other NAND memory cells store data according to a different storage scheme. Accordingly, two different collections of NAND memory cells located in different memory systems, or in the same memory system but in different dies, planes, blocks, word line layers, or word line cell groups, may store different numbers of bits-per-cell according to different storage schemes. To illustrate, one collection of NAND memory cells may be configured as SLC cells and another collection of NAND memory cells may be configured as MLC cells.

In addition, the same memory cell (or the same collection of memory cells) may be configured to store different numbers of bits-per-cell according to different storage schemes at different times. To illustrate, in one example, a memory cell may be configured as an SLC cell at one point in time, and then reconfigured as an MLC cell at a later point in time. As another example, a memory cell may be configured as an MLC cell at one point in time, and then reconfigured as an SLC cell at a later point in time. As another example, a memory cell may be configured as an MLC cell storing a first number of bits-per-cell at one point in time, and then reconfigured as an MLC cell storing a second number of bits-per-cell at a later point in time, where the first and second numbers are different from each other, with the first number being either less than or greater than the second number.

In addition, a memory cell stores data by having an associated storage parameter (alternatively or otherwise referred to as a characteristic, property, or feature) set to a level, value, magnitude, or state. The associated parameter is adjustable or variable, and can be controlled by biasing the control lines coupled to the memory cells at certain levels, at certain times, during certain memory operations, and according to certain storage schemes. Within one storage scheme defining a set of data values, a memory cell can store data at a certain one of the data values by having its storage parameter set to a level, value, magnitude, or state, or within a predetermined range of levels, values, magnitudes, or states. The level, value, magnitude, or state that the memory cell is at or set to corresponds to the data value of the set that the memory cell is storing. In addition, the memory cell can be configured to store a different value, or to change the data value of the data it is storing from one data value to another data value, by changing or adjusting the storage parameter to a different level, value, magnitude, or state.

The storage parameter that a memory cell has to store data depends on the memory technology, and can vary across different memory technologies. For NAND technology, the storage parameter is threshold voltage. At least with respect to NAND memory cells, a threshold voltage of a memory cell is a voltage applied to a control gate of the memory cell at which the memory cell becomes conductive. The level (otherwise referred to as the value or magnitude) of the threshold voltage depends on or is proportional to the amount of electrical charge that the memory cell is storing or trapping. The more charge that a memory cell is storing, the higher its threshold voltage, and the less charge that a memory cell is storing, the lower its threshold voltage. Accordingly, the data value that the memory cell is storing is set by setting the threshold voltage of the memory cell to a certain level, and the data value is adjusted or changed by changing the threshold voltage to a different level or within a different range of levels.

In addition, for NAND technology, the memory cells store data by being configured in memory states. As used herein, a memory state is an identifier that identifies a data value of data that a memory cell is storing, can store, or is intended to store. A storage scheme identifies or defines an associated plurality or set of memory states at which a memory cell can be configured. Each memory state identifies, corresponds to, and/or is associated with one of the plurality of data values identified or defined by the storage scheme. Accordingly, a memory cell configured in a given memory state is storing a data value that corresponds to the given memory state. A memory cell can store a different data value by being configured into a different memory state.

For a given storage scheme, the memory states include an erased state and one or more program states. An erased state is a memory state in which a memory cell is configured when erased. For at least some example configurations, the erased state is the memory state that all of a collection of memory cells are in at the start of a program operation to program at least some of the memory cells of the collection. A program state is a memory state that a memory cell is in upon being subjected to a program operation. At a given point in time, a memory cell may be in the erased state or one of the program states.

In addition, for a given storage scheme, each memory state has, corresponds to, or is associated with an associated range of threshold voltage levels, with each range being bounded by an upper threshold voltage level and a lower threshold voltage level. Otherwise stated, a given storage scheme may define a plurality of non-overlapping threshold voltage ranges, with each range being associated with or corresponding to a respective one of the plurality of memory states defined or identified by the given storage scheme. In turn, each range has, corresponds to, or is associated with a respective one of the data values. In this way, a storage scheme establishes a one-to-one correspondence between the threshold voltage ranges, the memory states, and the data values. Memory cells are programmed and read according to the one-to-one correspondence. That is, a memory cell configured with a threshold voltage level within a given threshold voltage range is configured in the memory state associated with the given threshold voltage range, and in turn is storing data having a data value that is associated with the given threshold voltage range and the corresponding memory state.

For particular embodiments, the erased state is associated with the lowest threshold voltage range. The program states are associated with consecutively or sequentially higher threshold voltage ranges from the range associated with the erased state.

In addition, the storage schemes may label or name the memory states in any of various ways, including alphabetically, numerically, or alphanumerically, as non-limiting examples. In particular example configurations, the erased state is called the erased state, and the program states are named with letters, numbers, or a combination thereof by associating higher letters in the alphabet or higher numbers with higher threshold voltage ranges. As illustrations, a memory state C is associated with a higher threshold voltage range than a memory state A, and a memory state 8 is associated with a higher threshold voltage range than a memory state 1. Various ways of labeling or naming memory states are possible.

In addition, memory states may be referred to as being higher memory states and lower memory states relative to each other. A first memory state is a higher memory state than a second memory state where the first memory state is associated with a higher threshold voltage range than the threshold voltage range with which the second memory state is associated. In addition, a first memory state is a lower memory state than a second memory state where the first memory state is associated with a lower threshold voltage range than the threshold voltage range with which the second memory state is associated.

In addition, the way in which the data values correspond to the memory states and/or the threshold voltage ranges may vary, and in particular embodiments, how the data values correspond to or are assigned to the memory states and/or threshold voltage ranges may depend on a particular code scheme, such as the Gray code scheme, for example.

In implementation, a collection of memory cells programmed into the same memory state may have an associated collection of threshold voltage as a result of the programming. The threshold voltages may be represented as a threshold voltage probability distribution, or just threshold distribution of the number of memory cell in the collection as a function of threshold voltage.

A given storage scheme may have a model, reference, ideal, or target threshold voltage distribution, which may be in the form of a continuous probability distribution, such as a Gaussian distribution, for example, for each of the memory states and associated threshold voltage ranges defined by the given storage scheme. A model threshold voltage distribution may represent a model of an ideal threshold voltage distribution for a collection of memory cells programmed into the same memory state to have. The lower and upper tails of the model threshold voltage distributions may align or correspond to the upper and lower threshold voltage levels of the ranges with which each of the model threshold voltage distributions is associated.

Referring back to FIG. 2B, the memory die 104 may further include a read/write circuit 144 that includes a plurality or a p-number of sense blocks (also referred to as sense modules or sense systems) 146. As described in further detail below, the sense blocks 146 are configured to participate in reading data from or programming data into word line cell groups of memory cells in parallel.

The memory die 104 may also include a row address decoder (or just row decoder) 148 and a column address decoder (or just column decoder) 150. The row decoder 148, which may also be referred to as a word line decoder, an x decoder, or an x-wire decoder, may decode a row address (also referred to as a word line address or an x address), and select a particular word line in the memory cell structure 142 corresponding to and/or identified by the decoded row address when reading data from or programming/writing data into to the memory cell structure 142. The column decoder 150, which may also be referred to as a bit line decoder, a y decoder, or a y-wire decoder, may decode a column address (also referred to as a bit line address or a y address), and select a particular bit line or group of bit lines in the memory cell structure 142 corresponding to and/or identified by the column address, when reading data from or programming data to the memory cell structure 142.

In addition, the non-volatile memory die 104 may include a peripheral circuit 152. The peripheral circuit 152 may include a control logic circuit (also referred to as a control logic, an on-chip controller, or an on-die controller) 154, which, at least in some example embodiments, may be implemented as a state machine, that is configured to control on-chip memory operations as well as send status information to the controller 102. The peripheral circuit 152 may also include an on-chip address decoder 156 that provides an address interface between addressing used by the controller 102 and/or a host and the addressing used by the row and column decoders 148, 150. In addition, the peripheral circuit 152 may include volatile memory 158. An example configuration of the volatile memory 158 may include latches, although other configurations are possible.

In addition, the peripheral circuit 152 may include a power control circuit 160 that is configured to generate and supply control line voltages (including voltage pulses) to control lines of the memory cell structure 142. The control line voltages include control gate line voltages supplied to control gate layers, bit line voltages supplied to bit lines, and supply line voltages supplied to supply lines. The control gate line voltages include word line voltages supplied to the word lines, drain select gate line voltages (SGD line voltages) supplied to the SGD lines, and source select gate line voltages (SGS line voltages) supplied to the SGS lines. The power control circuit 160 also be configured to generate and/or supply voltages other than the control lines voltages, including other voltages that may be supplied to the memory cell structure 142, the read/write circuits 144, the sense blocks 146, and/or other circuit components on the memory die 104.

The power control circuit 160 may include any of various circuit topologies or circuit configurations to generate and/or supply the voltages at appropriate levels to perform memory operations, (including read, program/write, sense, and erase operations), such as driver circuits, current sources, charge pumps, reference voltage generators, regulators, and pulse generation circuits, or any of various combinations thereof. Other types of circuits to generate the voltages may be possible. In addition, the power control circuit 160 may communicate with and/or be controlled by the control logic circuit 154, the read/write circuits 144, and/or the sense blocks 146 in order to supply the voltages at appropriate levels and at appropriate times to carry out the memory operations.

When the controller 102 determines to write (or program) data into the memory dies 104, the ECC module 124 first generates parity bits for the data during a parity bit generation process, also referred to as an encoding process. Parity bits are bits that the ECC module 124 uses during read operations to determine if bits read from the memory dies 104 have correct bit values, and uses the parity bits to correct bits that have incorrect bit values. Upon generating the parity bits, the ECC module 124 appends the parity bits to the data to form a codeword, and sends the codeword to the memory dies 104 for storage.

Figure 5:
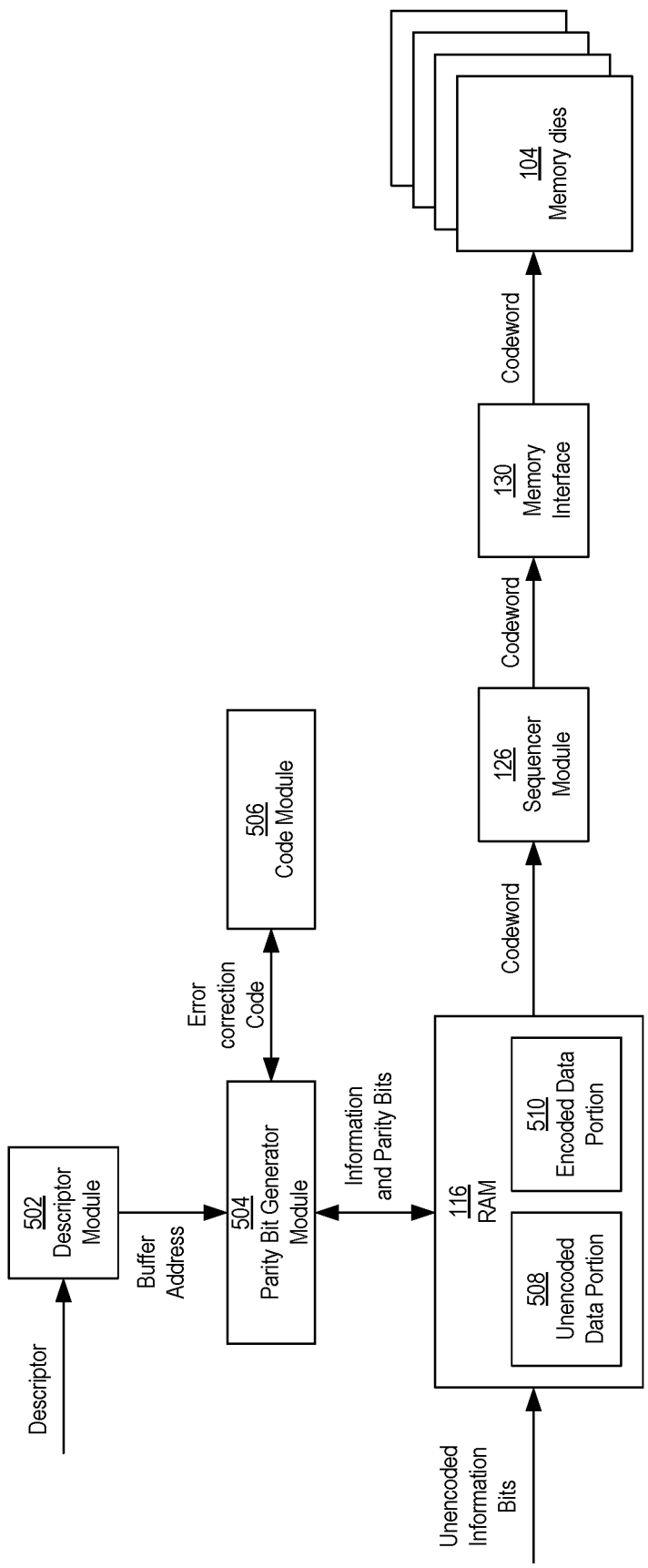
FIG. 5 is a block diagram of example modules of the memory system used to perform a parity bit generation process.

FIG. 5 shows a block diagram of components of the memory system 100 that may be involved in a parity bit generation process of a program (or write) operation. The components may include a descriptor module 502, a parity bit generator module 504, and a code module 506. For particular example configurations, the components may be components of the ECC module 124 of the controller 102, although in other example configurations, some or all of these components may be considered components separate from the ECC module 124 and/or separate from the controller 102.

In general, the memory system 100 may store data in the memory dies 104 as codewords (also referred to as an ECC page or a flash memory unit, as previously described). Each codeword may include information data (bits) and parity data (bits). The information bits may include payload data (bits), which includes the data that the host wants written to and read from the memory dies 104. The information bits may also include header data (bits), which may include various information about the payload data, such as logical address information, the write source, when the data is written (timestamp), flag fields, reversion numbers, and scrambler seeds as non-limiting examples. The parity bit generator module 504 may generate parity bits during read operations in order to detect and correct errors of the header and payload portions of the data during an error correction process of a read operation to read the data from the memory die 104.

Prior to the parity bit generation, the front end module 108 may load information bits to be written into the memory dies 104 in an unencoded data portion 508 of the RAM 116 in an unencoded or raw format. To initiate the parity bit generation process, the descriptor module 502 may be configured to receive a descriptor from the descriptor generator module 136 (FIG. 2A). The descriptor may identify that it is a descriptor for a write operation. In addition, the descriptor may identify the buffer address where the unencoded data is being stored in the unencoded data portion 508 of the RAM 116. The descriptor may also identify the physical address of a memory die 104 where the data is to be stored.

Upon receipt of the descriptor, the descriptor module 502 may provide the physical address where the data is to be stored in the memory die 104 to the parity bit generator module 504. The parity bit generator module 504 may retrieve the information bits in the encoded data portion 508 and generate the parity bits associated with the information bits.

The parity bit generator module 504 may be configured to generate the parity bits using an error correction code stored in the code module 506. In particular example configurations, the code module 506 includes memory storing one or more error correction codes. The memory may be a standalone memory component, or may be a part of any or a plurality of storage locations within the non-volatile memory system 100 (e.g., part of the RAM 116 or part of a memory die 104) and/or external to the non-volatile memory system 100. In some embodiments, the one or more error correction codes may be stored in the memory dies 104, and the controller 102 may be configured to load a copy of the one or more error correction codes into the code module 506, such as during initialization and/or when reading and/or writing data to a particular die 104.

In general, an error correction code is a data set that determines the parity bits (including the bit values of the parity bits) for a given set of information bits. For at least some example configurations, an error correction code has a corresponding matrix in which the bit values of the error correction code are arranged. In some example configurations, an error correction code stored in the code module 506 is a low-density parity-check (LDPC) error correction code having a corresponding LDPC matrix, also referred to as a LDPC parity-check matrix or just parity-check matrix H. The parity bit generator module 502 may be configured to generate the parity bits for a codeword such that following matrix equation is satisfied:

$$H\omega = 0, \qquad (1)$$

where H is the parity-check matrix and ω is the codeword including the information bits and the parity bits. In addition to generating parity bits, the parity bit generator module 504 may generate the codewords ω, such as by appending the parity bits to the raw data (i.e., the information bits and/or the header bits). Additionally, the parity bit generator module 504 may format the codeword ω such the first J bits of the codeword ω are equal to an information bit sequence β of the information bits, and the last K bits of the codeword ω are equal to the parity bit sequence δ of the parity bits. The parity bit generator module 504 may then generate the parity bits such that the following equation is satisfied:

$$H \cdot \begin{bmatrix} \beta \\ \delta \end{bmatrix} = 0. \quad (2)$$

In some LDPC encoding schemes, the parity bit generator module 504 may generate the parity bit sequence δ may be taking advantage of the sparse nature of the parity-check matrix H in accordance with LDPC.

Figure 6:
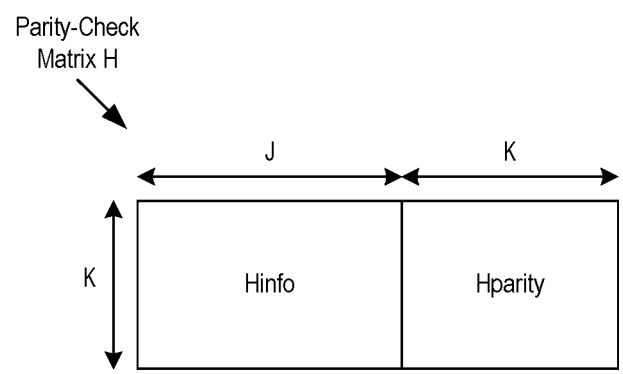
FIG. 6 is a schematic diagram of a generic layout of a parity-check matrix.

FIG. 6 shows a schematic diagram of a generic layout of a parity-check matrix H. The parity-check matrix H may include a first submatrix $H_{info}$ and a second submatrix $H_{parity}$. The first submatrix $H_{info}$ may include a J-number of columns equal to a J-number of bits in the information bit sequence β. The second submatrix $H_{parity}$ may include a K-number of columns that is equal to the K-number of bits in the parity bit sequence δ. Also, as shown in FIG. 6, each of the first submatrix $H_{info}$ and the second submatrix $H_{parity}$ have a K-number of rows equal to the K-number of bits in the parity bit sequence δ.

Additionally, the first submatrix $H_{info}$ and the second submatrix $H_{parity}$ are positioned relative to each other such that the last column of the first submatrix $H_{info}$ is adjacent to the first column of the second submatrix $H_{parity}$. Also, the order of the rows are common amongst the first and second submatrices $H_{info}$, $H_{parity}$. In other words, the first row of the first submatrix $H_{info}$ forms a common row with the first row of the second submatrix $H_{parity}$, and so on. Further, the elements of the first and second submatrices $H_{info}$, $H_{parity}$ (K by J elements for the first submatrix $H_{info}$ and K by K elements for the second submatrix $H_{parity}$) may each include binary "0" and "1" values. The makeup of the 0 and 1 values may be in accordance with various encoding schemes, such as LDPC or Quasi-Cyclic (QC)-LDPC codes, as examples.

Figure 7:
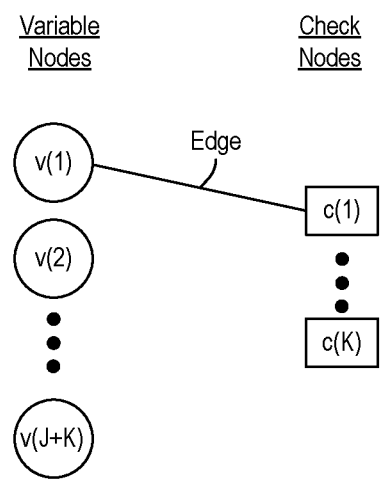
FIG. 7 is a schematic diagram of a partially completed Tanner graph corresponding to the parity-check matrix of FIG. 6.

The parity-check matrix H may have a corresponding Tanner graph. FIG. 7 shows a schematic diagram of a partially completed Tanner graph corresponding to the parity-check matrix H of FIG. 6. In general, a Tanner graph may include variable nodes (or just variables), check nodes (or just checks), and edges connecting the check nodes and the variables nodes. The number of variable nodes may be equal to the number of columns in the parity-check matrix H and the number of bits in a codeword ω. Accordingly, a Tanner graph may include a J+K number of variable nodes v(1) to v(J+K) corresponding to the J-number of bits in the information bit sequence β and the K-number of parity bits of the parity bit sequence δ. The number of check nodes may be equal to the number of rows in the parity-check matrix H and the number of parity bits in the parity bit sequence δ. Accordingly, there may be a K-number of check nodes c(1) to c(K) corresponding to the K-number of parity bits in the parity bit sequence δ. A particular variable node may be connected to a particular check node via an edge or connection if the element in the parity-check matrix H corresponding to that variable node and that check node has a 1 value instead of a 0 value. For example, FIG. 7 shows an edge connecting the first variable node v(1) and the first check node c(1).

In other example configurations, an error correction code stored in the code module 506 is a data set that has a corresponding generating matrix G. Unlike the parity-check matrix, the generating matrix G may not be a low-density matrix or otherwise considered sparse. For such example configurations, the parity bit generator module 504 may generate the codeword ω according to the following mathematical formula:

$$\omega = \beta G, \quad (3)$$

where G is the generating matrix, β are the information bits, and ω is the codeword. Similar to the parity-check matrix H, the generating matrix G may have its own associated Tanner graph that includes variable nodes, check nodes, and edges.

Referring back to FIG. 5, upon retrieving an error correction code from the code module 506, the parity bit generator module 504 may use the error correction code to generate the parity bits δ for the unencoded information bit sequence β stored in the unencoded data portion 508 of the RAM 116, such as in accordance with equations (1), (2), and/or (3) above. The parity bit generator module 504 may store the information bits β in combination with the associated parity bits δ to form the codeword ω. Additionally, the parity bit generator module 504 may store the codeword ω in an encoded data portion 510 of the RAM 116.

In order to program a codeword ω in the memory dies 104, the sequencer module 126 retrieves the codeword ω and sends the codeword ω to the memory dies 104 via the memory interface 130. In response, the read/write circuit 144 (FIG. 2B) on the memory die 104 receiving the codeword ω may perform a series of program actions to store the codeword ω in a storage location in the memory cell structure 142 identified by and/or corresponding to the memory address information that was identified in the descriptor module 502.

At some point during the lifetime of the memory system 100, some of the memory cells of a memory cell structure 142 (FIG. 2B) may store data unreliably. The reliability of a memory cell to store data is a measure of the memory cell's ability to return data having a correct data value—i.e., a data value that matches or is the same as the data value that the memory cell is programmed to store. The reliability may be quantified in terms of a probability or a likelihood that the data value read from the memory cell is the correct data value. The greater the reliability of a memory cell, the higher the probability or likelihood that the data read from the memory cell is correct.

When the controller 102 wants to read data from a plurality of memory cells of a memory cell structure 142, such as a codeword of data, a page of data, or a block of data, as examples, the controller 102 may expect to receive the data with an expected bit error rate (BER), which may be a number of incorrect or erroneous bits divided by a total number of bits of the data. An incorrect or erroneous bit is a bit having a bit value different from a bit value of the bit that a memory cell is programmed to store.

In some example configurations, the controller 102 may be configured to assign reliability statuses to memory cells from which it reads data. In particular example configurations, each reliability status may be one of two possible reliability statuses, including reliable and unreliable. In general, the controller 102 reads data from unreliable memory cells with a higher BER than from reliable memory cells. Correspondingly, the controller 102 may be configured to expect to receive data from unreliable memory cells and reliable memory cells according to different BERs. For example, the controller 102 may expect to receive data from unreliable memory cells according to a first BER, and may expect to receive data from reliable memory cells according to a second BER, where the first BER is higher than the second BER.

When the controller 102 reads data from a plurality of memory cells, the plurality may include both reliable and unreliable memory cells. In turn, the combination of the first and second BERs may contribute to or yield the expected BER with which the controller 102 expects to receive the plurality of memory cells.

In addition or alternatively to assigning reliability statuses to memory cells, the controller 102 may assign reliability statuses to bit lines coupled to memory cells structure. In general, the controller 102 may determine the reliability statuses of bit lines and memory cells coupled to the bit lines to be the same as each other. Accordingly, reliability statuses of bit lines and memory cells may depend on each other. That is, the reliability status of a bit line may depend on and/or be the same as the reliability status of a memory cell coupled to the bit line. In addition or alternatively, the reliability status of a memory cell may depend on and/or be the same as the reliability status of a bit line coupled to the memory cell. As an example, if the controller 102 identifies a memory cell as unreliable, the controller 102 may, in turn, identify the bit line coupled to memory cell as unreliable. As another example, if the controller 102 identifies a bit line as unreliable, the controller 102 may, in turn, identify the memory cells coupled to the bit line as unreliable.

In addition or alternatively to assigning reliability statuses to memory cells and/or bit lines, the controller 102 may assign reliability statuses to bits stored in the memory cells. In general, the controller 102 may determine the reliability statuses of bits to be the same as the reliability statuses of memory cells storing the bits and/or the bit lines coupled to the memory cells storing the bits. That is, the reliability status of a bit may depend on and/or be the same as a reliability status of a memory cell storing the bit, and/or a reliability status of a bit line coupled to the memory cell storing the bit. In addition or alternatively, the reliability status of a memory cell may depend on and/or be the same as a reliability status of a bit stored in the memory cell. In addition or alternatively, the reliability status of a bit line may depend on and/or be the same as the reliability status of a bit stored in a memory cell coupled to the bit line. As an example, if the controller 102 identifies a bit as unreliable, the controller 102 may identify a memory cell storing the bit as unreliable and/or a bit line coupled to the memory cell storing the bit as unreliable.

In addition, for some example configurations, the controller 102 may assign reliability statuses to memory cells, bit lines, and/or bits on a group basis. To do so, the controller 102 may arrange or organize memory cells into memory cell groups, bit lines into bit line groups (or bit line columns) as previously described, and bits into groups. In general, a group may include one or more elements, and the elements of a same group include the same reliability status as each other. In general, the controller 102 may determine the reliability statuses of bit groups to be the same as the reliability statuses of memory cell groups storing the bits of the bit groups, and/or the bit line groups coupled to the memory cell groups storing the bit groups. That is, the reliability status of a bit group may depend on and/or be the same as a reliability status of a memory cell group storing the bits of the bit group, and/or a reliability status of a bit line group coupled to the memory cell group storing the bits of the bit group. In addition or alternatively, the reliability status of a memory cell group may depend on and/or be the same as a reliability status of a bit group stored in the memory cell group. In addition or alternatively, the reliability status of a bit line group may depend on and/or be the same as the reliability status of a bit group stored in a memory cell group coupled to the bit line group. As an example, if the controller 102 identifies a bit group as unreliable, the controller 102 may identify a memory cell group storing the bits of the bit group as unreliable and/or a bit line group coupled to the memory cell group storing the bit group as unreliable.

In addition, as described in further detail below, the controller 102 may be configured to identify, manage, determine, analyze, access, store, and perform error correction processes using unreliability status information. As used herein, unreliability status information is information identifying one or more reliability statuses of one or memory cells, one or more bit lines, one or more bits, one or more bit line groups, one or more memory cell groups, one or more bit groups, or a combination thereof. In particular configurations, unreliability status information identifies one or more unreliable memory cells, one or more unreliable bit lines, one or more unreliable bits, one or more unreliable memory cell groups, one or more unreliable bit line groups, one or more unreliable bit groups, or a combination thereof. In addition, the reliability information may include identifiers that identify the unreliable memory cells, bit lines, or bits. As an example, the reliability information may include bit line addresses that identify bit lines or bit line groups. A bit line address identified or included in the reliability information may identify that a bit line addressed by the bit line address is unreliable, a bit line group addressed by the bit line address is unreliable, a memory cell coupled to a bit line addressed by the bit line address is unreliable, a memory cell group coupled to a bit line group addressed by the bit line address is unreliable, a bit stored in a memory cell coupled to a bit line addressed by the bit line address is unreliable, or a bit group stored in a memory cell group coupled to a bit line group addressed by the bit line address is unreliable.

In addition, for purposes of the present description, the term "bad" or "weak" may be used interchangeably with "unreliable." Accordingly, the term "bad" or "weak" may be used in conjunction with data and/or various memory locations or components of a memory cell structure or a block storing the data (e.g., memory cells, memory cell groups, bit lines, bit line groups, or other groupings or zones of memory components) to indicate those storage locations or components as unreliable and/or that are at least identified in the memory system 100 as being unreliable or "weak". Similarly, the term "good" or "strong" may be used to refer to reliable storage locations or components and/or that are identified in the non-volatile memory system 100 as being reliable. In addition, the terms "bad," "weak," "good" and "strong" may be used in conjunction with data (including bits of data) to indicate that the data is to be stored or is being stored in reliable and unreliable storage locations, respectively.

In some embodiments, memory cells coupled to the same bit line may be similarly unreliable. That is, if one memory cell coupled to a particular bit line is unreliable, the other memory cells coupled to that bit line may also be unreliable. Accordingly, the controller 102 may be configured to identify unreliable memory cells on a bit line basis. If the controller 102 identifies a bit line as unreliable, the controller 102 may identify or presume that the memory cells coupled to that bit line are bad, less reliable, weak, or unreliable. In addition, if the controller 102 identifies a particular memory cell as unreliable, the controller 102 may identify or presume that the other memory cells coupled to the same bit line are also unreliable and identify that bit line as an unreliable or bad bit line. Also, if the controller 102 does not identify any memory cells coupled to a bit line as being unreliable, the controller 102 may identify that bit line as a reliable or good bit line.

In addition, the controller 102 may be configured to identify reliable/good and unreliable/bad bit lines on a column basis. If the controller 102 identifies at least one bit line in a column as bad or unreliable, the controller 102 may identify all of the bit lines in that column as bad or unreliable, or generally that the column is unreliable or bad. Alternatively, if the controller 102 does not identify any bit lines in a column as unreliable, the controller 102 may identify that column as good or reliable.

In addition, unreliable/bad memory cells are considered to be defective memory cells, in that the memory cell structure 142 in which an unreliable memory cell is located has a defect causing the memory cell to store data unreliably. Unreliable memory cells may be defective for any number of various reasons. As examples, a memory cell structure 142, such as its blocks, may include open circuits, closed circuits, or short circuits that affect the ability of memory cells to retain charge or conduct current that can be sensed to correctly read the data stored in the memory cells. In addition, the memory cells may be defective for endurance or retention reasons, such as because the memory cells are subjected to a number of program/erase cycles exceeding a threshold number, or because the memory cells are subjected to program disturbs, where neighboring memory cells, coupled to the same word line or an adjacent word line, are programmed at different, such as higher states, causing other memory cells to change the memory states from which they were programmed.

Additionally, some unreliable memory cells in a memory system 100 may store data unreliably from the beginning of the life of the memory system 100, such as upon being manufactured. Manufacturing processes, such as die sort processes, may detect these unreliable memory cells during manufacturing. Upon detection, the controller 102 and/or the memory dies 104 may be configured to know or determine the unreliable memory cells and the addresses at which the unreliable memory cells are located. Accordingly, during a remaining life of the memory system 100 following manufacturing, such as after the memory system is purchased as a product and used in its ordinary course of operation, the controller 102 and/or the memory dies 104 may know to avoid programming data into these unreliable memory cells, or at least know that the memory cells will return data unreliably and take appropriate action when writing and reading data from the unreliable memory cells.

Other unreliable memory cells may initially be reliable memory cells at the time of manufacturing, but then become unreliable during their life after manufacturing, such as after purchase and through use during the memory system's ordinary course of operation. The defects causing these memory cells to become unreliable are called grown defects. Because grown defects are not detected during manufacturing, the controller 102 and/or the memory dies 104 do not have advanced knowledge of these defects, and in turn, do not know these memory cells are unreliable before programming data into them. In turn, the controller 102 programs data into these unreliable memory cells, and then experiences problems when reading data from these unreliable memory cells, due to the data having a large number of errors.

The following embodiments describe components of the ECC module 124 that detect unreliable bits, memory cells, and/or bit lines during error correction processes of a read operation based on the error correction code used to generate parity bits for the data during the write operation. In response to the detections, the ECC module 124 may set reliability metrics, such as log likelihood ratios (LLRs), to values that indicate relatively low levels of reliability for bits of the unreliable bit groups. Such relatively low levels of reliability may indicate lower, and thus more accurate, reliability levels than the reliability metrics would otherwise indicate if the ECC module 124 did not detect the unreliable bits, memory cells, and/or bit lines. The more accurate reliability levels improve the ability of the ECC module 124 to correct a threshold number (e.g., all) of the bit errors of a read codeword. In particular, through generation of more accurate reliability levels, the ECC module 124 increases the probability that it successfully corrects a threshold amount (e.g., all) of the bit errors of a read codeword, and/or increases the rate at which it successfully corrects the threshold amount of errors for read codewords. In addition or alternatively, through generation of more accurate reliability levels, the ECC module 124 may complete the error correction processes faster and more efficient, resulting in the memory system performing overall faster and more efficient read operations, and consuming less power to correct bit errors.

Figure 8:
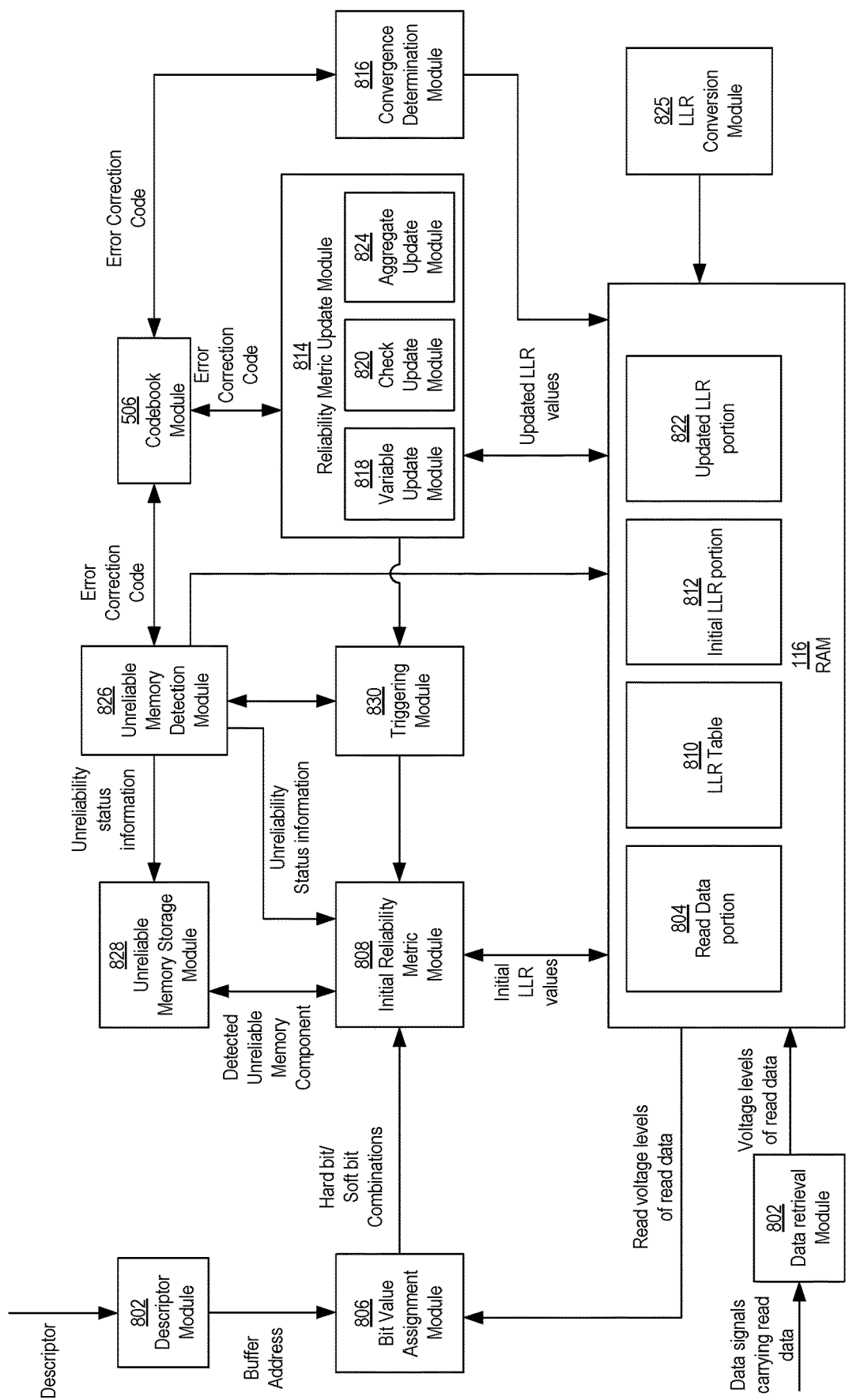
FIG. 8 is a block diagram of an example embodiment of modules of the memory system used to perform an error correction process.

FIG. 8 shows a block diagram of an example embodiment of components of the memory system 100 that may be involved in an error correction process (also referred to as an error detection process, an error detection and correction process, or a decoding process) of a read operation to read data from a memory die 104. The components are described as being part of the ECC module 124 of the controller 102, although in other example configurations, some or all of these components may be considered components separate from the ECC module 124 and/or separate from the controller 102.

Prior to an error correction process, a data retrieval module 802 may receive data signals carrying encoded data to be read from a memory die 104, and may load the encoded data into a read data portion 804 of the RAM 116. In some example configurations, the data retrieval module 802 may include synchronous circuitry, such as flip flops or latches, that captures or otherwise identifies the levels of pulses of the data signals, and stores data in the read data portion 804 according to the levels that it captures. Assuming that the data retrieval module 802 captures the levels correctly, the levels indicate read voltage levels at which the bits were read from the memory cells of the memory die 104 storing the data.

To initiate the error correction process, the descriptor module 802 may be configured to receive a descriptor from the descriptor generator module 136 (FIG. 2A). The descriptor may identify that it is a descriptor for a read operation. In addition, the descriptor may identify the buffer address where the encoded data is being stored in the RAM 116. The descriptor may also identify the physical address in the non-volatile memory die 104 where the encoded data is stored.

The component may further include a bit value assignment module 806 configured to assign hard bit and/or soft bits to the bits of the read codeword. The bit value assignment module 806 may be configured to access the codeword loaded in the RAM 116 using the buffer address information. Upon accessing the codeword, the bit value assignment module 806 may be configured to identify the read voltage levels of the bits, and assign a bit representation corresponding to the read voltage of each of the bits of the codeword. The bit representation may be in a single-bit or multi-bit (or n-bit, where n is two or more) format. In the multi-bit format, the number of bits is typically two or three, although more than three may be possible.

In the single-bit (or one-bit) format, each ith bit of the codeword read may be represented as or by a single bit representation. These single-bit representations, referred to as hard bits, may each correspond to a logic 1 or logic 0 value and are indicative of the values of the bits as identified as being read from the non-volatile memory die 104.

In the n-bit (or multi-bit) format, each ith bit of the codeword read from the non-volatile memory dies 104 may be represented as or by an n-bit representation. Each n-bit representation may include a hard bit and an (n−1) number of soft bits. The soft bit(s) provide a probability, reliability or confidence level that the value of the associated hard bit is correct, i.e., it matches the value of the ith bit when written into the memory die 104. The combination of the hard bit and the (n−1) soft bit(s) (referred to herein as a hard bit/soft bit combination or hard bit/soft bit representation) can be one of $2^n$ possible binary values. For example, for a two-bit format, each bit of the codeword read from the non-volatile memory 104 may be represented by a two-bit representation that includes the hard bit and one soft bit, which may also include a logic 1 or logic 0 value. As another example, for the three-bit format, each bit of the codeword read from the non-volatile memory dies 104 may be represented by a three-bit representation, which may include a hard bit and two soft bits, each of which may correspond to a logic 1 or logic 0 value.

The bit value assignment module 806 may be configured to assign bit representations for each of the bits of a read codeword according to read threshold voltage levels, which may include a hard bit threshold voltage level Vt and a plurality of soft bit threshold voltage levels. For some example configurations, the read threshold levels may be set relative to cell voltage distributions (e.g., estimated cell voltage distributions).

Figure 9:
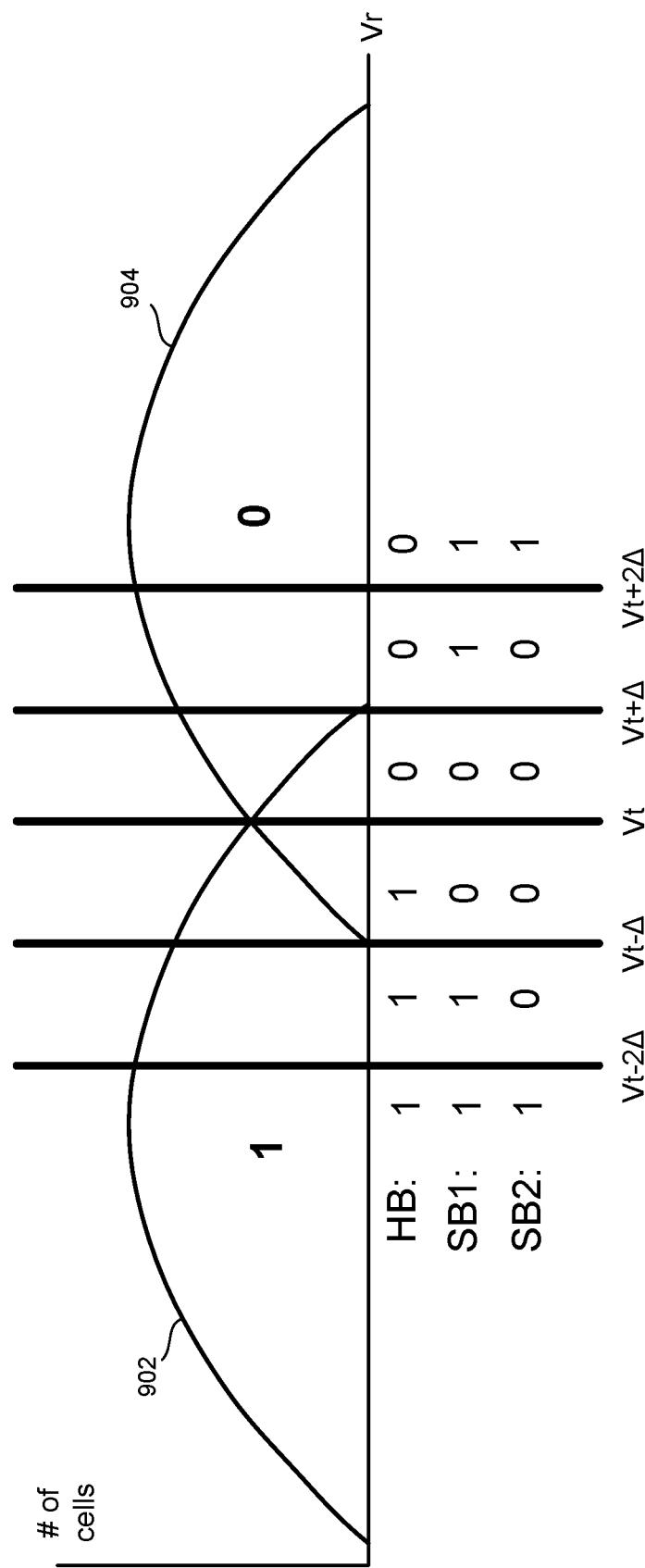
FIG. 9 is schematic diagram of cell voltage distributions and read threshold levels.

FIG. 9 shows a plot of read threshold levels plotted relative to cell voltage distributions for an encoding/decoding scheme that uses two soft bits. The cell voltage distributions of FIG. 9 may include a first cell voltage distribution (CVD) curve 902 associated logic 1 values and a second CVD curve 904 associated with logic 0 values. The first and second CVD curves may be estimated distributions of read voltages Vr associated with logic 1 and logic 0 values for bits of a given read codeword. As shown in FIG. 9, the first and second CVD curves 902, 904 may generally have the same shape, but shifted relative to the read voltage levels Vr.

An intersection point of the first and second CVD curves 902, 904 may determine a hard bit threshold voltage level Vt. For an ith bit of the codeword, if the bit value 804 identifies the read voltage level as being greater than the hard bit threshold voltage level Vt, then the bit value assignment module 804 may assign a logic 0 value to the hard bit representation of that ith bit. Conversely, if the bit value assignment module 804 identifies the read voltage level as being less than the hard bit threshold level Vt, then the bit value assignment module 804 may assign a logic 1 to the hard bit representation of that ith bit.

In addition to the threshold voltage level Vt, for a two-bit soft bit scheme, four soft bit threshold voltage levels may determine the logic levels of the soft bits, with two being greater than the hard bit threshold voltage Vt and two being less than the hard bit threshold voltage Vt. In particular, going from left to right in FIG. 9, a first soft bit threshold voltage level is two times a delta amount of voltage (Δ) less than the hard bit threshold voltage (Vt−2Δ), a second soft bit threshold level is one delta amount of voltage less than the hard bit threshold voltage (Vt−Δ), a third soft bit threshold level is one delta amount of voltage greater than the hard bit threshold (Vt+Δ), and a fourth soft bit threshold level is 2 times the delta amount of voltage greater than the hard bit threshold (Vt+2Δ).

For a given ith bit, where the associated read voltage level is relative to the hard bit threshold level and the soft bit threshold levels may determine the logic values assigned to the associated soft bits. In particular, with reference to FIG. 9, if the associated read voltage level is less than the first soft bit threshold level, then the bit value assignment module 804 may assign both the associated first soft bit (SB1) and the second soft bit (SB2) a logic 1 value (or in other words a two-bit soft bit value of "11"). If the associated read voltage level is greater than the first soft bit threshold level and less than the second soft bit threshold level, then the bit value assignment module 804 may assign a logic 1 value for the first soft bit (SB1) and a logic 0 value for the second soft bit (SB2) (or in other words a two-bit soft bit value of "10"). If the associated read voltage level is greater than the second soft bit threshold level and less than the hard bit threshold level Vt, then the bit value assignment module 804 may assign the first and second soft bits both a logic 0 value (or in other words a two-bit soft bit value of "00"). The soft bit logic value assignments may be mirrored for read voltages greater than the hard bit threshold level Vt. If the associated read voltage level is greater than the hard bit threshold level Vt and less than the third soft bit threshold level, then the bit value assignment module 804 may assign the first and second soft bits both a logic 0 value. If the associated read voltage level is greater than the third soft bit threshold level and less than the fourth soft bit threshold level, then the bit value assignment module 804 may assign a logic 1 value for the first soft bit and a logic 0 value for the second soft bit. If the associated read voltage level is greater than the fourth soft bit threshold level, then the bit value assignment module 804 may assign the associated first and second soft bits both a logic 1 value.

An aspect of the relative positioning of the first and second CVD curves 902, 904 is that for an ith bit of a codeword, the further a read voltage level is away from the hard bit threshold level Vt, the greater the likelihood that the logic level associated with the ith bit (i.e., the logic level assigned to the hard bit) is correct. That is, for read voltage levels below the hard bit threshold level Vt, the greater the amount a given read voltage level is below the hard bit threshold level Vt, the greater the likelihood that assigning a logic 1 value to the hard bit is the correct bit value for the ith bit, and the closer the given read voltage level is to the hard bit threshold level Vt, the less likely that assigning a logic 1 value to the hard bit is correct. In the same manner, for read voltage levels above the hard bit threshold level Vt, the greater the amount a given read voltage level is above the hard bit threshold level Vt, the greater the likelihood that assigning a logic 0 value to the hard bit is the correct bit value for the ith bit, and the closer the given read voltage level is to the hard bit threshold level Vt, the less likely that assigning a logic 0 value to the hard bit is correct.

The degree of likelihood or how reliable that a logic value assigned to a hard bit is correct is reflected in the soft bit values. For example, in FIG. 9, two-bit soft bit values of "11" are used to denote a highest degree of likelihood or reliability that the associated hard bit is correct, two-bit soft bit values of "10" are used to denote an intermediate or medium degree of likelihood or reliability that the associated hard bit is correct, and two-bit soft bit values of "00" are used to denote the lowest degree of likelihood or reliability that the associated hard bit is correct.

Use of the three two-bit values "11" "10" and "00" to indicate the high, medium, and low levels or reliability, respectively, is merely an example, and other ways to indicate the three different degrees of reliability may be possible. For example, the two-bit value of "00" may be used to indicate the highest degree of reliability and the two-bit value of "11" may be used to indicate the lowest degree of reliability. As another example, more than two bits may be used to indicate the three various degrees. Also, similar implementations may be made for one-bit soft bit encoding/decoding schemes or for hard bit only encoding/decoding schemes. In particular, a one-bit soft bit encoding scheme would have two levels of reliability. Also, an encoding/decoding scheme that uses only hard bits would have zero levels of reliability. For simplicity, reference hereafter is made to two-bit soft bit encoding/decoding schemes, although similar implementations for other encoding/decoding schemes using zero, one, or more than two soft bits may be possible.

Referring back to FIG. 8, the components of FIG. 8 may further use reliability or soft metrics to perform decoding. A reliability metric (or a soft metric) of a bit is a value that indicates a bit value of the bit and an indication of a reliability (also referred to as a likelihood or a probability) that the bit value is correct. Each ith reliability metric of a given set of reliability metrics may be associated with an ith bit of a codeword. A value of a reliability metric of a bit may include a sign component and a magnitude component. The sign component may indicate a bit value of the bit. The magnitude component may indicate the reliability (or the likelihood or probability) that the bit value indicated by the sign component is correct. In one example decoding scheme, the higher the magnitude, the higher the likelihood or reliability. Conversely, the lower or closer the magnitude is to zero, the lower the likelihood or reliability.

Various types of reliability metrics may be possible. One type of reliability metric is a log likelihood ratio (LLR). A LLR for a given ith bit may be defined as the log of the probability of the ith bit being a logic 0 value divided by the probability of the ith bit being a logic 1 value. A different log base may be used for the LLR, such as a natural base or a log 2 base (which may be more convenient for hardware implementation). Another reliability metric may be a likelihood ratio (LR), which is similar to the log likelihood ratio, except that it is not a log-based value. A yet another reliability metric may be the probability of the ith bit being a logic 0 value, without considering the probability of the ith bit being a logic 1 value. Other reliability metrics considering the probability of bits being certain logic values may be possible.

Hereafter, the reliability metric values that the components of FIG. 8 are described as using or generating are LLR values. However, other implementations may similarly use or generate other equivalent or corresponding reliability metrics.

The components may further include an initial reliability metric module 808 may be configured to determine initial LLR values for the bits of the read codeword. The initial reliability metric module 808 may determine the initial LLR values based on the values of the hard bit/soft bit combinations of the bits. For some example configurations, such as indicated in FIG. 8, the initial reliability metric module 808 may receive the hard bit/soft bit combinations from the bit value assignment module 806. In other example configurations, the bit value assignment module 806 may store the hard bit/soft bit combinations in the RAM 116, and the initial reliability metric module 808 may access the hard bit/soft bit combinations from the RAM 116.

To assign an initial LLR value to a given bit of a read codeword, the initial reliability metric module 808 determines a sign component and a magnitude component. The combination of the sign component and the magnitude component form the initial LLR value. The sign component is either a positive sign or a negative sign. When determining the initial LLR values, the initial reliability metric module 808 may determine the sign component based on the hard bit values. For example, the initial reliability metric module 808 may assign a negative sign to an LLR value if the hard bit has a logic 1 value, and may assign a positive sign to an LLR value if the hard bit has a logic 0 value. Additionally, the initial reliability metric module 808 may determine the magnitude component based on the soft bit values. Each soft bit value may have an associated initial LLR value, and the initial reliability metric module 808 may assign a value for the magnitude component that corresponds to the soft bit value. For example, with reference to FIG. 9, a two-bit soft bit value of "00" may have a corresponding first LLR magnitude value, a two-bit soft bit value of "10" may have a corresponding second LLR magnitude value, and a two-bit soft bit value of "11" may have a corresponding third LLR magnitude value. For a given bit, the initial reliability metric module 808 may assign a value for the magnitude component that corresponds to a soft bit value of the given bit.

For some example configurations, the initial reliability metric module 808 may select initial LLR magnitude values from an LLR table 810 loaded into the RAM 116, as shown in FIG. 8. When assigning an initial LLR value for a bit, the initial reliability metric module 808 identifies the associated soft bit value, and then selects the LLR magnitude value in the LLR table 810 that corresponds to the identified soft bit value.

Upon determining the sign component and the magnitude component of an initial LLR value for a bit, the initial reliability metric module 808 may combine the sign component and the determined magnitude component to form an initial LLR value for the bit. The initial reliability metric module 808 may determine initial LLR values for at least some of the bits of a read codeword, and store the initial LLR values for the bits in an initial LLR portion 812 of the RAM 116.

Additionally, for at least some example configurations, the initial reliability metric module 808 may create and store each of the initial LLR values as m-bit values. For such configurations, a sign component may be a single bit, referred to as a sign bit. Each sign bit can have a logic 1 value to represent one of the signs (e.g., the positive sign), or a logic 0 value to represent the other sign (e.g., the negative sign). Additionally, a magnitude component may be a p-bit value, where p is one or more. In particular example configurations, p is 5 or 6 bits.

The components that perform an error correction process may further include a reliability metric update module 814 and a convergence determination module 816. The reliability metric update module 814 performs reliability metric update processes. The convergence determination module 816 determines when convergence is reached. The reliability metric update module 814 and the convergence determination module 816 may operate together to determine or identify a set of correct bit values for a read codeword, which includes fixing or correct any errors in the bit values of the bits of the read codeword.

In further detail, a reliability metric update process is a series or sequence of actions performed, over a single or a plurality of iterations or cycles, to update, change, or modify the set of initial LLR values to a set of updated LLR values that indicates a threshold number of bit values of the codeword. In particular example configurations, the threshold number is all of the bit values of the codeword. The convergence determination module 816 determines when the set of updated LLR values indicates that the threshold number of correct bit values is reached.

In particular example configurations, the reliability metric update module 814 is configured to perform reliability metric update processes as message passing processes. A message passing process is a type of reliability metric update process that updates LLR values by calculating and updating a first set of updated LLR values that indicate reliabilities (or likelihoods or probabilities) that bit values are logic 1 or logic 0 values for variable nodes connected to check nodes, and by calculating and updating a second set of updated LLR values that indicate reliabilities (or likelihoods or probabilities) that bit values are logic 1 or logic 0 values for check nodes connected to variable nodes. The reliability metric update module 814 iteratively calculates and updates the second sets of LLR values based on the first sets of LLR values, and the first sets of LLR values based on the second sets of LLR values.

In the example configuration of FIG. 8, the reliability metric update module 814 includes a variable update module 818 that calculates the first sets of updated LLR values, and a check update module 820 that calculates the second sets of updated LLR values. In order to generate the first set of updated LLR values, the variable update module 818 may execute a first LLR update algorithm that receives as inputs the initial LLR values and the second set of updated LLR values. In addition, in order to generate the second set of updated LLR values, the check update module 820 may execute a second LLR update algorithm that receives as inputs the first set of updated LLR values. Each LLR value of the first and second sets may be referred to as message. In this context, the variable update module 818 and the check update module 820 perform message passing. When the variable update module 818 calculates the first set of updated LLR values, it effectively passes the first set of updated LLR values as messages to the check update module 820, which the check update module 820 receives as inputs to calculate the second set of updated LLR values. Similarly, when the check update module 820 calculates the second set of updated LLR values, it effectively passes the second set of updated LLR values as messages to the variable update module 818, which the variable update module 818 receives as inputs to calculate the first set of LLR values. In practical implementation, each of the variable and check update modules 818, 820 may store their respective sets of updated LLR values in an updated LLR portion 822 of the RAM 116, which each other can access in order to retrieve the others sets of updated LLR values in order to calculate their own sets of updated LLR values.

In addition, the first LLR update algorithm that the variable update module 818 executes may include a plurality of first LLR functions that includes a plurality of sets of first LLR functions, where each set is for a respective one of the plurality of variable nodes. In addition, each first LLR function of a set of first LLR functions for a given variable node is to calculate a first updated LLR value for a respective one of a plurality of check nodes to which the given variable node is connected. To execute a first LLR function for a given variable node connected to a given check node, the variable update module 818 may receive as inputs the initial LLR value for the given variable node, and one or more update LLR values from the second set for one or more check nodes connected to the given variable node. In some example configurations, the variable and check update module 818, 820 may perform extrinsic message passing in that the one or more update LLR values from the second set are for one or more check nodes connected to the given variable node other than or except the given check node.

Similarly, the second LLR update algorithm that the check update module 818 executes may include a plurality of second LLR functions that includes a plurality of sets of second LLR functions, where each set is for a respective one of the plurality of check nodes. In addition, each second LLR function of a set of second LLR functions for a given check node is to calculate a second updated LLR value for a respective one of a plurality of variable nodes to which the given check node is connected. To execute a second LLR function for a given check node connected to a given variable node, the check update module 820 may receive as inputs or more update LLR values from the first set for one or more variable nodes connected to the given check node. In some example configurations, when performing extrinsic message passing, the one or more updated LLR values from the first set are for one or more variable nodes connected to the given check node other than or except the given check node.

Additionally, for some example configurations, the reliability metric update module 814 may further include an aggregate update module 824 configured to determine a plurality of aggregate updated LLR values, each of a respective one of the variable nodes. In some example configurations, the reliability metric update module 814 may execute an aggregate LLR update algorithm that includes a plurality of aggregate LLR functions, each for a respective one of the variable nodes. In some example configurations, the aggregate LLR functions may be similar to the first LLR functions, except that for a given variable node, the aggregate LLR function receives as inputs the one or more updated LLR values from the second set for all of the check nodes connected to the given variable node.

The reliability metric update module 814 may perform an iteration or cycle of the message passing process when the variable update module 818 calculates the first set of updated LLR values, such as through execution of the first LLR update algorithm, and the check update module 820 calculates the second set of updated LLR values, such as through execution of the second LLR update algorithm. Additionally, an iteration or cycle of the message passing process may include the aggregate update module calculating a set of aggregate updated LLR values, such as through execution of the aggregate LLR update algorithm. The reliability metric update module 814 may continue to perform iterations or cycles of the message passing process by calculating additional or more first and second sets of updated LLR values, such as by iterating through the first and second LLR update algorithms, and the aggregate LLR update algorithm, until the convergence determination module 816 determines that convergence is reached.

The convergence determination module 816 may determine that convergence is reached based on one or more of the sets of updated LLR values. In particular example configurations, the convergence determination module 816 determines whether convergence is reached based on sign components of the set of aggregate updated LLR values.

In order to determine whether convergence is reached, the convergence determination module 816 may execute a convergence detection algorithm that receives as inputs the one or more sets of updated LLR values (e.g., the sign components of the set of aggregate updated LLR values). The convergence determination module 816 may execute the convergence algorithm to generate a convergence metric value.

Upon generating the convergence metric value, the convergence determination module 816 may determine whether convergence is reached by determining whether the convergence metric value satisfies a predetermined criterion. If the convergence metric value satisfies the predetermined criterion, then the convergence determination module 816 determines that it has achieved convergence. Alternatively, if the convergence metric value does not satisfy the predetermined criterion, then the convergence determination module 816 determines that it has not achieved convergence.

For some example configurations, the convergence determination module 816 may compare the determined convergence metric value with a target value (or range of target values) to determine if the convergence metric value satisfies the criterion. If the convergence determination module 816 determines that the convergence metric value matches the target value or falls within the range of target values, then the convergence determination module 816 may determine that the criterion is satisfied and that it has achieved convergence. Alternatively, if the convergence module 816 determines that the determined convergence metric value does not match the target value or falls outside of the range of target values, then the convergence determination module 816 may determine that the criterion is not satisfied and that it has not achieved convergence.

For some example configurations, the convergence metric value is a syndrome weight W, which is a sum of a plurality of syndrome values s. A syndrome value is a value for a check node, where the value is a modulo 2 (or XOR) summation of bit values of the variables nodes connected to the check node. A syndrome vector $\bar{s}$ is a vector of the syndrome values for all of the checks. Mathematically, a syndrome vector $\bar{s}$ is determined according to the following formula:

$$\bar{s} = H \cdot \bar{y}, \quad (4)$$

where H is the parity-check matrix used to generate the parity bits for the codeword, $\bar{y}$ is a vector of current bit values of the codeword, and where the dot-product mathematical calculation denoted in equation (4) is a modulo2 calculation. In particular example configurations, the current bit values of the codeword are the sign bits of the input LLR values at the beginning of a reliability metric update process, or sign components of a set of the updated LLR values (e.g., the sign components of the set of aggregate updated LLR values).

The syndrome weight W is the sum of the syndrome values s of the syndrome vector $\bar{s}$. In particular example configurations, when the syndrome weight W is zero, the convergence determination module 816 determines that current bit values of all of the bits are correct, and convergence is achieved. Additionally, when the syndrome weight W is greater than zero, the convergence determination module 816 determines that the current bit values of the bits are not all correct, and convergence is not achieved. In turn, the convergence determination module 816 determines to perform or initiate a next cycle or iteration of the reliability metric update process.

In addition, the convergence determination module 816 may determine whether it has achieved convergence at various points in time during the reliability metric update process. In some example configurations, the convergence determination module 816 may determine whether convergence is reached after a predetermined number of iterations or cycles of the reliability metric update process. In some example configurations, the predetermined number is one, and in other example configurations, the predetermined number is more than one. In addition or alternatively, in some example configurations, the predetermined number is the same throughout the reliability metric update process. For example configurations, the predetermined number varies. Various ways of configuring the convergence determination module 816 to check or determine whether convergence is achieved may be possible.

When convergence is reached, an LLR conversion module 825 may convert the sign bits of the adjusted LLR values (e.g., the sign bits of the aggregate adjusted LLR values) to final bit values of the data that is returned to the host. For some example configurations, the LLR conversion module 825 may store the data having the final bit values in the read data portion 804 before the front end module 108 transfers the data back to the host to complete the read operation.

As previously described, when the memory cell structure 142 experiences grown defects, the bit values of bits stored in memory cells affected by the grown defects may have hard errors, in that statistically, the bits may have actual probabilities reliabilities of being correct that are relatively low. In many error correction processes, the reliabilities of these bits as indicated by their soft bit representations are higher than their actual reliabilities. Consequently, for bits stored in memory cells affected by grown defects, the bit value assignment module 806 provides soft bits having wrong indications of the reliability of the bits to the reliability metric module 808. In turn, the reliability metric module 808 determines magnitude components of the initial LLR values from the soft bits that are not informative in that the determined LLR values do not accurately indicate the statistical likelihood of the sign bits being correct. In turn, the reliability metric update module 814 fails, or at least struggles, to determine updated LLR values that enables the convergence determination module 816 to determine that convergence is reached.

To overcome this problem, the ECC module 124 includes an unreliable memory detection module 826 that is configured to detect unreliable bits, memory cells, and/or bit lines based on an error correction code used to generate parity bits. The unreliable memory detection module 826 may detect the bits, memory cells, and/or bit lines as unreliable due to grown defects in the memory cell structures 142 of the memory dies 104 that are not detected during manufacturing, although other reasons causing the unreliable memory detection module 826 to detect a bit, a memory cell, or a bit line as unreliable may be possible. Through detection of the unreliable bits, memory cells, and/or bit lines, the initial reliability metric module 808 and/or the reliability metric update module (such as with the variable update module 818 and/or the aggregate update module 824) may determine input reliability metric values, such as input LLR values, that more accurately reflect the reliability of the unreliable bits. In turn, the reliability metric update module 814 can calculate more accurate sets of updated LLR values, which in turn increases the probability that the convergence module 816 determines that convergence is reached, and/or that increases the rate at which the reliability metric update module 814 determines updated LLR values that enables the convergence determination module 816 to determine convergence is reached, despite the grown defects. In addition or alternatively, the reliability metric update module 814 may determine a set of updated LLR values that enables or leads to convergence in fewer cycles or iterations, which in turn results in a faster or more efficient error correction process and/or read operation.

In addition, for at least some example configurations, the ECC module 124 may include an unreliable memory storage module 828 that includes a memory configured to store unreliability status information identifying the detected unreliable bits, memory cells, bit lines, bit groups, memory cell groups, and/or bit line groups. For example, upon detecting an unreliable bit, bit group, memory cell, memory cell group, bit line, or bit line group, the unreliable memory detection module 826 may store unreliability status information that identifies the detected unreliable bit, bit group, memory cell, memory cell group, bit line, or bit line group in the unreliable memory storage module 828. The components of the ECC module 124 may then access the unreliable memory storage module 828 to access or identify the unreliable bit, bit group, memory cell, memory cell group, bit line, or bit line group when performing error correction.

Additionally, to improve error correction processes, the reliability metric module 808 uses the unreliability status information to set and/or adjust values of the input reliability metrics, such as the input LLR values. In particular example configurations, the reliability metric module 808 may set or adjust the magnitude components of LLR values to indicate lower reliabilities for the input LLR values corresponding to unreliable bits.

Additionally, for some example configurations, the unreliable memory detection module 826 provides the unreliability status information it detects to the initial reliability metric module 808. In response, the initial reliability metric module 808 sets or adjusts the magnitude components of the initial LLR values representing the unreliable bits. In other example configurations, the initial reliability metric module 808 may access the unreliable memory storage module 828 to identify the unreliability status information, instead of receiving the unreliability status information directly from the unreliable memory detection module 826.

In addition, for some example error correction processes, the initial reliability metric module 808 may set the initial LLR values dependent on the unreliability status information. For example, at the start of an error correction process, before the initial reliability metric module 808 assigns an initial LLR value to a bit, the initial reliability metric module 808 may determine whether the bit is unreliable based on the unreliability status information. If it is, then the initial reliability metric module 808 may set the magnitude component of the initial LLR value to a value that corresponds to the unreliable bit. If not, then the initial reliability metric module 808 may set the magnitude component of the initial LLR value to a value from the LLR table 810 that corresponds to the soft bits identified by the bit value assignment module 806.

For other example error correction processes, the initial reliability metric module 808 may adjust the magnitude components of the initial LLR values from initial values to values dependent on the unreliability status information. For example, at the start of an error correction process, the initial reliability metric module 808 may assign each of the bits an initial LLR value based on the hard bit/soft bit combinations it receives from the bit value assignment module 806, and/or by selecting the magnitude values from the LLR table 810. Then, the reliability metric module 808 may determine which, if any, bits are unreliable based on the unreliability status information. Upon making the determination, the initial reliability metric module 808 may adjust the magnitude component of an initial LLR value from an initial value to a value corresponding to the bit being unreliable as indicated by the unreliability status information. In particular, the adjustment may lower the reliability indicated by the magnitude component.

In addition, for some example configurations, the initial reliability metric module 808 may be configured to automatically set or adjust the LLR values dependent on the unreliability status information. That is, when an error correction process is underway and the initial reliability metric module 808 assigns initial LLR values to the bits, the initial reliability metric module 808 may automatically check the unreliability status information to determine if a bit is unreliable. For other example configurations, the initial reliability metric module 808 may be configured to set or adjust the initial LLR values only in response to a predetermined triggering event. For such example configurations, the ECC module 124 may include a triggering module 830 that detects, determines, or identifies triggering events that trigger the initial reliability metric module 808 to assign initial LLR values to bits based on the unreliability status information. In the absence of a triggering event, the initial reliability metric module 808 assigns the initial LLR values independent of the unreliability status information. However, upon detecting a triggering event, the triggering module 830 may instruct the initial reliability metric module 808 to set the initial LLR values dependent on unreliable bits, memory cells, and/or bit lines identified in the unreliability status information.

In some example configurations, the triggering event is based on a value that the unreliable memory detection module 826 calculates or determines in order to detect the unreliable bits, memory cells, bit lines, bit groups, memory cell groups, and/or bit line groups. For example, as described in further detail below, the triggering event may be a number of unsatisfied checks exceeding a threshold. The unreliable memory detection module 826 may determine a number of unsatisfied checks, and the triggering module 830 may determine that the number of unsatisfied checks exceeds a threshold. In response, the initial reliability metric module 808 sets or adjusts the initial LLR values dependent on the unreliability status information.

For other example configurations, the triggering event is based on a value or metric determined during a convergence process. For example, the triggering event may be a syndrome weight value W exceeding a threshold. At the start of or during a reliability metric update process, the convergence determination module 816 may determine a syndrome weight value W, and the triggering module 830 may determine that the syndrome weight value W exceeds a threshold. In response, the initial reliability metric module 808 sets or adjusts the initial LLR values dependent on the unreliability status information. As another example, the triggering event may be a number of cycles of iterations of the reliability metric update process exceeding a threshold. The convergence determination module 816 may determine a number of cycles or iterations that the reliability metric update module 814 has performed, and the triggering module 830 may determine that the number of cycles exceeds a threshold. In response, the triggering module 830 may control the reliability metric update module 814 to stop the reliability metric update process, and instruct the initial reliability metric module 808 to adjust the magnitude components of the initial current LLR values dependent on the unreliability status information. After the initial reliability metric module 808 adjusts the magnitude components, the triggering module 830 may instruct the reliability metric update module 814 to resume the reliability metric update process. In doing so, the variable update module 818 and/or the aggregate update module 824 may use the adjusted initial LLR values, rather than the original initial LLR values, as inputs when executing their respective LLR update algorithms for subsequent iterations.

In addition or alternatively, the triggering event may be an expiration of a predetermined time period, which may or may not be directly dependent on a number of cycles of a reliability metric update process. For example, the triggering module 830 may manage a timer. When a reliability metric update process starts, the triggering module 830 may start the timer. When the timer reaches the predetermined time period, the triggering module 830 determines that the predetermined time period has expired. In response, the triggering module 830 may control the reliability metric update module 814 to stop the reliability metric update process, and instruct the initial reliability metric module 808 to adjust the magnitude components of the initial current LLR values dependent on the unreliability status information. After the initial reliability metric module 808 adjusts the magnitude components, the triggering module 830 may instruct the reliability metric update module 814 to resume the reliability metric update process. In doing so, the variable update module 818 and/or the aggregate update module 824 may use the adjusted initial LLR values, rather than the original initial LLR values, as inputs when executing their respective LLR update algorithms for subsequent iterations.

In addition or alternatively, for some example error correction processes, the initial reliability metric module 808 may set or adjust the initial LLR values dependent on the unreliability status information before a reliability metric update process begins, such as before an initial cycle or iteration of the reliability metric update process begins. For other example error correction processes, the initial reliability metric module 808 may set or adjust the initial LLR values dependent on the unreliability status information after the reliability metric update process begins but before the reliability metric update process ends. For example, after a reliability metric update process begins, the triggering module 830 may detect that a predetermined time period has expired, or that the reliability metric update process has reached or exceeded a predetermined number of cycles, and in turn, trigger the initial reliability metric module 808 to adjust the magnitude components of the initial LLR values dependent on the unreliability status information.

In addition, for at least some example configurations where the initial reliability metric module 808 waits to be triggered before setting or adjusting the initial LLR values, the unreliable memory detection module 826 may also or similarly wait to be triggered before detecting unreliable bits, memory cells, and/or bit lines. For example, rather than automatically detect unreliable bits, memory cells, and/or bit lines during an error correction process, the unreliable memory detection module 826 may detect the unreliable bits, memory cells, and/or bit lines in response to detection of a triggering event. In response to the triggering event, the unreliable memory detection module detects one or more unreliable bits, memory cells, and/or bit lines, and in turn, the initial reliability metric module 808 sets or adjusts the LLR values dependent on the one or more detected bits, memory cells, and/or bit lines.

In summary, the improved ECC module 124 of the present description includes an unreliable memory detection module 826 that uses an error correction code to identify unreliable bits, memory cells, bit lines, bit groups, memory cell groups, and/or bit line groups. During an error correction process, the ECC module 124 sets or adjusts initial reliability metrics, such as initial LLRs, to values dependent on the detected unreliable bits, memory cells, bit lines, bit groups, memory cell groups, and/or bit line groups, such that the set or adjusted values reduce the reliability that associated bits have correct bit values. By setting or adjusting the initial reliability metrics to values dependent on the detected unreliable bits, memory cells, bit lines, and/or associated groups, the ECC module 124 calculates more accurate initial LLR values, compared to if the ECC module 124 did not set or adjust the initial reliability metric values based on the detection. In turn, the ECC module 124 has a higher probability to converge (correct the errors in the received bits), performs fewer cycles or iterations to correct incorrect bit values, resulting in a faster and more efficient error correction process, an overall faster and more efficient read operation, and less power consumption.

Figure 10:
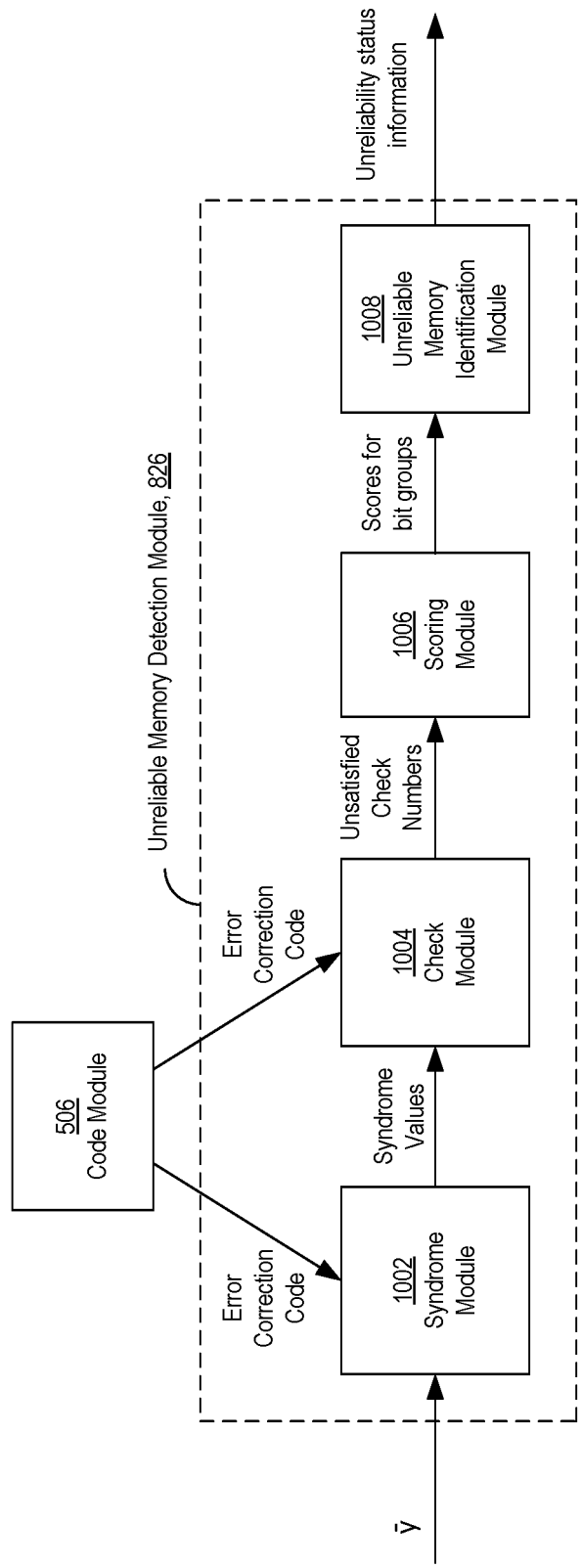
FIG. 10 is a block diagram of an example configuration of an unreliable memory detection module of FIG. 8.

FIG. 10 shows a block diagram of an example configuration of the unreliable memory detection module 826 of FIG. 8. In general, the unreliable memory detection module 826 detects unreliable memory components based on the error correction code used to generate the parity bits of the codewords. In the example configuration of FIG. 10, the unreliable memory detection module 826 determines a number of unsatisfied checks for a set of current bit values of a read codeword. In some example configurations, the set of current bit values is an initial set of current bit values of the codeword when initially read from the memory die 104 before the reliability metric update process begins. Based on the number of unsatisfied checks, the unreliable memory detection module 826 determines a plurality of scores for a plurality of bit groups. The bit groups correspond to memory components that the unreliable memory detection module 826 can identify as unreliable. Accordingly, upon determining the scores, the unreliable memory detection module 826 may determine or select one or more of the bit groups as unreliable, and in turn identify one or more corresponding memory cell groups and/or bit line groups as unreliable.

In further detail, the example configuration in FIG. 10 may include a syndrome module 1002, a check module 1004, a grouping module 1006, a scoring module 1008, and an unreliable memory identification module 1010. The syndrome module 1002 may be configured to determine syndrome values, or a syndrome vector, for a set of current bit values $\bar{y}$ of a read codeword. As previously described, a syndrome value is a value for a check node, where the value is a modulo 2 (or XOR) summation of bit values of the variables nodes connected to the check node, and a syndrome vector $\bar{s}$ is a vector of the syndrome values for all of the checks. The syndrome module 1002 may be configured to determine or calculate the syndrome values through execution of a formula implementing the mathematical equation (4) above.

The check module 1004 may be configured to determine numbers of unsatisfied checks for the bits of a codeword based on the current set of bit values. An unsatisfied check is a check (or check node) that does not meet a check convergence constraint of the error correction code. On the other hand, a satisfied check is a check (or check node) that meets a check convergence constraint of the error correction code. During a write operation, the parity bit generator module 504 (FIG. 5) may generate the parity bits such that each of the check nodes meet the check convergence constraint. Subsequently, during a read operation, each of the check nodes meets the check convergence restraint or requirement when all of the current bit values are correct. Correspondingly, during a read operation, some of the check nodes being unsatisfied is an indication that some of the bits of the read codeword are not correct.

In some example configurations, the check convergence constraint is based on syndrome values. A check is a satisfied check when its syndrome value is a first value (e.g., 0 in particular configurations), and a check is an unsatisfied check when its syndrome value is a second value (e.g., 1 in particular configurations).

The check module 1004 may determine a number of unsatisfied checks u for each bit of a codeword. As previously explained, each bit of a codeword corresponds to a variable node for an error correction code, and each variable node is connected to one or more check nodes via edges. Accordingly, a number of unsatisfied checks u for a bit is a number of unsatisfied checks connected to a variable node corresponding to the bit. For example, if a variable node of a given bit is connected to 5 check nodes, and 3 of the 5 check nodes are unsatisfied, then the check module 1004 determines that the given bit has 3 unsatisfied checks. In particular example configurations, in order to determine the numbers of unsatisfied checks, the check module 1004 may determine or calculate numbers of unsatisfied checks for the bits of a codeword through execution of an algorithm or formula according to the following mathematical equation:

$$\bar{u} = \bar{s}H, \quad (5)$$

where $\bar{u}$ is a vector of numbers of unsatisfied checks for each of the bits. While the syndrome module 1002 may execute equation (4) using modulo2 operations to calculate the syndrome vector $\bar{s}$, the check module 1004 may calculate numbers through normal addition and multiplication (non-modulo2) when executing equation (5).

In response to the check module 1004 calculating the numbers of unsatisfied checks for each of the bits, the scoring module 1006 may perform a scoring process in which the scoring module 1006 calculates a plurality of scores based on the unsatisfied check numbers. In particular, the scoring module 1006 may calculate a score for each bit group of the plurality of bit groups. To do so, the unreliable memory detection module 826 may know or identify which bits belong to which bit groups. In turn, upon receipt of the scores, the scoring module 1006 may identify a bit that each unsatisfied check number is for, and in turn, calculate a score for a given bit group based on the unsatisfied checks numbers for the bits belonging to the bit group. To complete the scoring process, the scoring module 1006 generates a score for each bit group of a read codeword. Accordingly, the number of scores the scoring module 1006 generates is equal to the number of bit groups into which the plurality of bits of a codeword are organized.

The number of bits in a bit group may correspond to and/or be equal to the number of memory cells of a memory cell group and/or a number of bit lines of a bit line group. In general, a bit group can include either a single bit or a plurality of bits. For some example configurations, where the unreliable memory detection module 826 is configured to identify single memory cells or single bit lines as unreliable, each bit group includes a single bit. For other example configurations, where the unreliable memory detection module 826 is configured to identify groups of memory cells or groups of bit lines as unreliable, each bit group includes a number of bits equal to the number of memory cells in a memory cell group, or a number of bit lines in a bit line group. For example, if a bit line group includes 16 bit lines, then a bit group includes 16 bits. Identifying groups of bits, memory cells, and/or bit lines as unreliable may be advantageous in that doing so may offset the sensitivity of the error correction code to errors due to its tendency to align with bursts of data stored in memory cells coupled to adjacent bit lines, in turn offsetting the weakness that the parity bits have to correct incorrect bit values of unreliable bits.

In response to the scoring module 1006 determining scores for the bit groups, the unreliability memory identification module 1008 may determine unreliable bit groups and/or corresponding unreliable memory components, including unreliable memory cells and/or bit lines, based on the scores. To do so, the scores that the scoring module 1006 calculates may have values that indicate respective unreliability rankings of the bit groups. An unreliability ranking of a bit group is a measure that indicates a degree of unreliability that the bits of the bit group have correct bit values. As used herein, the higher the unreliability ranking, the more unreliable (or less reliable) that the bits of a bit group have correct bit values, and the lower the unreliability ranking, the less unreliable (or more reliable) that the bits of a bit group have correct bit values.

The unreliable memory detection module 826 can use values of scores to correspond to unreliability rankings in any of various ways. In some example embodiments, the values of the scores may be directly proportionate to the unreliability rankings—the higher the value of a score, the higher the unreliability indicated by the score, and the lower the value of a score, the lower the unreliability indicated by the score. For other example embodiments, the values of the scores may be inversely proportionate to the unreliability rankings—the lower the value of a score, the higher the unreliability indicated by the score, and the higher the value of a score, the lower the unreliability indicated by the score. In still other example embodiments, the scores and the rankings may have relationships or correspondences that are neither directly nor inversely proportionate. In addition or alternatively, for some example configurations, the unreliable memory detection module 826 may utilize a table or other data structure that maps scores to rankings.

Based on the scores, the unreliable memory identification module 1008 may determine zero or one or more of the bit groups to be unreliable. The unreliable memory identification module 1008 may determine which bit groups are unreliable in any of various ways. In some example configurations, the unreliable memory identification module 1008 is configured to identify a predetermined number bit groups as unreliable. For such example configurations, the unreliable memory identification module 1008 may select the predetermined number of highest ranked bit groups—i.e., those predetermined number of bit groups with scores indicating the highest degrees of unreliability. In particular example configurations, the predetermined number is one, and the unreliable memory identification module 1008 selects the bit group with the highest unreliability ranking. Such configurations may be suitable for memory systems having a high statistical likelihood that a given block has no more than one grown defect associated with a detected unreliable memory component.

For other example configurations, the unreliable memory identification module 1008 is configured to identify bit groups as unreliable based on whether the bit groups have scores that satisfy an unreliability threshold that sets or establishes a baseline or boundary between a bit group and/or a memory component being identified as reliable or unreliable. For such example configurations, the unreliability memory identification module determines that a bit group is unreliable if its score satisfies the unreliability threshold, and determines that a bit group is reliable if the score does not satisfy the unreliability threshold.

For example configurations where higher scores indicate higher degrees of unreliability, the unreliable memory identification module 1008 may identify that a score satisfies the unreliability threshold if the values of the score is at or above (greater than or equal to) the unreliability threshold, and may identify that a score does not satisfy the unreliability threshold if the score value is below or less than the unreliability threshold. In addition, for example configurations where lower scores indicate higher degrees of unreliability, the unreliable memory identification module 1008 may identify that a score satisfies the unreliability threshold if the value of the score is at or below (less than or equal to) the unreliability threshold, and may identify that a score does not satisfy the unreliability threshold if the value of the score is above the unreliability threshold.

For such example configurations where the unreliable memory identification module 1008 identifies bit groups as unreliable based whether the bit groups have scores that satisfy the unreliability threshold, the number of unreliable bit groups that the unreliable memory identification module 1008 detects is not a fixed, constant, or predetermined number, but rather a variable number that is dependent on whether each bit group has a score that satisfies the unreliability threshold. Accordingly, for such example configurations, the unreliable memory identification module 1008 may detect zero, at least one but less than all, or all of the bit groups as unreliable.

For at least some example configurations, upon detecting unreliable bit groups based on the scores, the unreliable memory detection module 826 may identify unreliable memory cell groups including the memory cells storing the bits of the unreliable bit groups. For example, the unreliable memory detection module 826 may identify an addresses for the memory cell groups (such as a physical address including a die number, a plane number, a block number, a word line number (row address), a word line cell group number, a bit line address (column address), etc.). In addition or alternatively, the unreliable memory detection module 826 may identify unreliable bit line groups coupled to the memory cell groups storing the bits of the unreliable bit groups. For example, the unreliable memory detection module 826 may identify a bit line address (e.g., column address) for the bit line groups.

Upon detecting the unreliable bit groups, memory cell groups, and/or bit line groups, the unreliable memory detection identification module 1008 may notify the initial reliability metric module 808 of the unreliable bit groups, memory cell groups, and/or bit line groups it detected, such as in the form of unreliability status information as previously described. In addition or alternatively, the unreliable memory identification module 1008 may store the unreliable status unreliability status information in the unreliable memory storage module 828.

Figure 11:
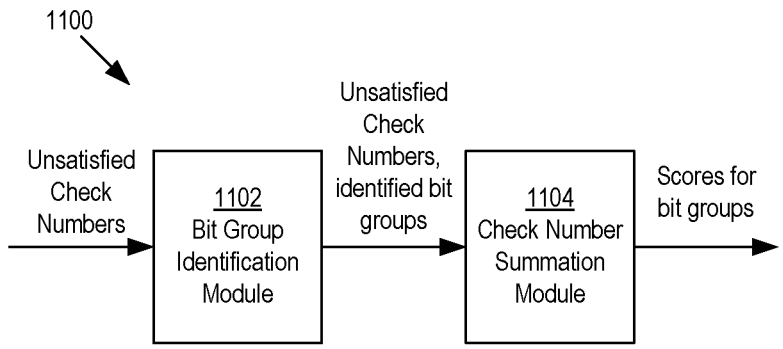
FIG. 11 is a block diagram of an example scoring module.

FIG. 11 shows a block diagram of an example scoring module 1100, which may be representative of an example configuration for the scoring module 1006 of FIG. 10. The scoring module 1100 is configured to determine or calculate scores by adding or summing the unsatisfied check numbers for bits of the same bit group. Accordingly, the example scoring module 1100 calculates a plurality of scores for a plurality of bit groups, where each score for a given bit group is based on a sum of the unsatisfied check numbers of the bits of the given bit group. In the example configuration in FIG. 11, the scoring module 1100 includes a bit group identification module 1102 configured to receive a plurality of unsatisfied check numbers for the plurality of bits of a codeword, and identify which of the plurality of bit groups each of the unsatisfied check numbers belongs. The example scoring module 1100 further includes a check number summation module 1004 that sums the unsatisfied check numbers of a bit group for each of the bit groups to generate the scores for each of the bit groups.

For some example configurations that determine scores by summing the unsatisfied check numbers for bits of the same bit group, the unreliable memory identification module 1008 may determine a predetermined number of bit groups with the highest sums as a predetermined number of unreliable bit groups. For other example configurations, the unreliable memory identification module 1008 compares each sum with a threshold value. If a sum for a given bit group is at or above the threshold, then the unreliable memory identification module 1008 identifies the given bit group as unreliable.

Figure 12:
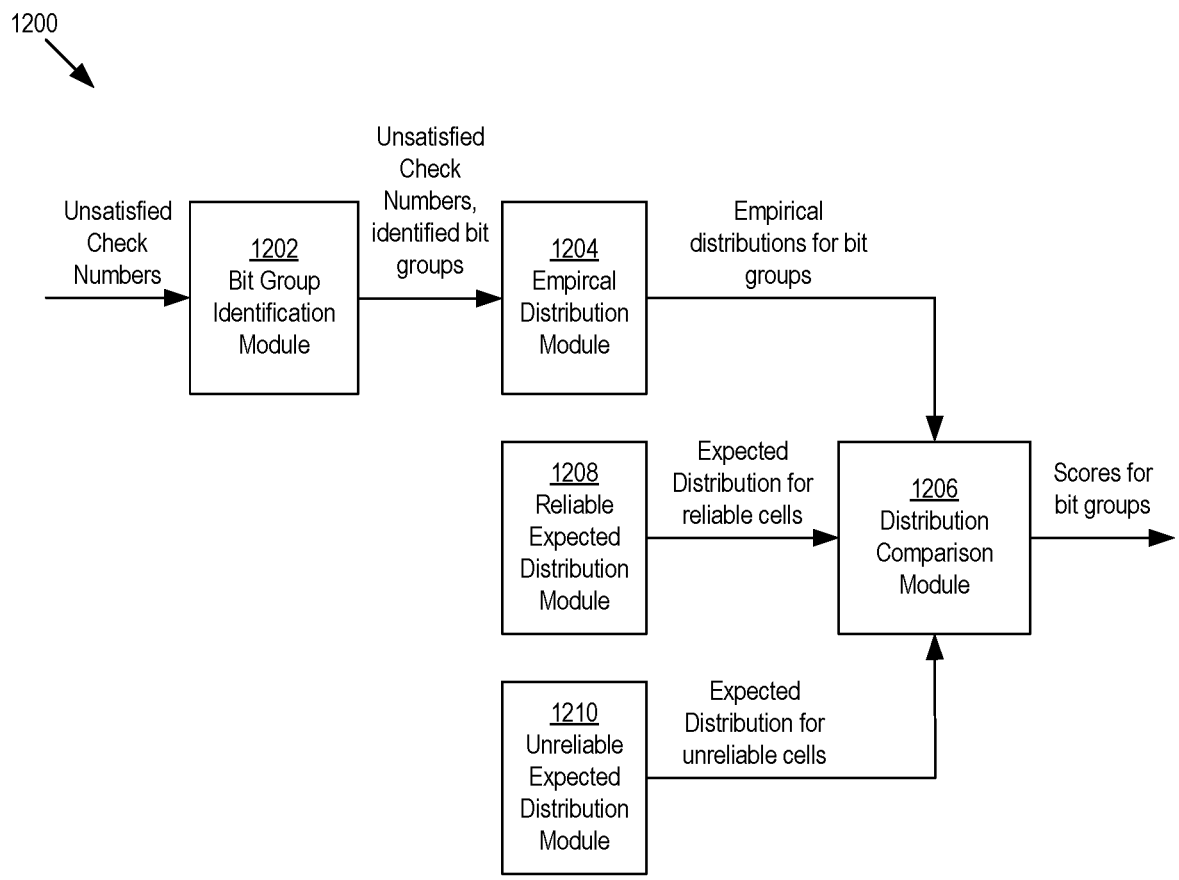
FIG. 12 is a block diagram of another example scoring module.

FIG. 12 shows a block diagram of another example scoring module 1200, which may be representative of another example configuration for the scoring module 1006 of FIG. 10. The scoring module 1200 is configured to determine or calculate scores by comparing empirical distributions of the numbers of unsatisfied check numbers for the bit groups with at least one of an expected distribution of unsatisfied check numbers for reliable bit groups or an expected distribution of unsatisfied check number for unreliable bit groups. Based on the comparisons, the scoring module 1200 determines whether each of the empirical distributions for the bit groups are sufficiently close to the expected distribution for the unreliable bit groups such that the bit groups are unreliable, or sufficiently far from the expected distribution for the unreliable bit groups such that the bit groups are reliable.

The example scoring module 1200 may performing the comparisons by determining or measuring a statistical similarity (also referred to as a statistical proximity) between empirical distributions of the plurality unsatisfied check numbers of the bit groups, and at least one of an expected distribution of unsatisfied check numbers for reliable bit groups or an expected distribution of unsatisfied check numbers for unreliable bit groups. Herein, an expected distribution of unsatisfied check numbers for reliable bit groups is referred to as a reliable expected distribution, and an expected distribution of unsatisfied check number for unreliable bit groups is referred to as an unreliable expected distribution.

In general, a statistical similarity of two distributions is a statistical measure of how close two distributions resemble each other. The example scoring module 1200 may be configured to execute a statistical function to determine a statistical similarly. Two example types of statistical similarities include a statistical distance and a statistical divergence. A statistical distance between two distributions quantifies a distance between the two distributions. A statistical divergence, like a statistical difference, quantifies a distance between two distributions, but without requiring symmetry between the two distributions—i.e., the divergence from a first distribution to a second distribution is not equal to the divergence from a second distribution to a first distribution. The scoring module 1200 may use the reliable and unreliable expected distributions as reference distributions. The closer an empirical distribution (which in some embodiments may correspond to a lower value resulting from execution of the statistical function) of a given bit group is to the unreliable expected distribution, the higher its ranking or degree of unreliability, and the farther an empirical distribution (which in some embodiments may correspond to a higher value resulting from execution of the statistical function) of a given bit group is to the unreliable expected distribution, the lower its ranking or degree of unreliability. Similarly, the closer an empirical distribution of a given bit group is to the reliable expected distribution, the lower its ranking or degree of unreliability, and the farther an empirical distribution of a given bit group is to the reliable expected distribution, the higher its ranking or degree of unreliability. The scoring module 1200 may determine distances or divergences between the empirical distributions and the unreliable expected distribution, between the empirical distributions and the reliable expected distribution, or both, and determine or calculate scores based on the determined distances or divergences.

In the example configuration in FIG. 12, the scoring module 1200 may include a bit group identification module and an empirical distribution module 1204. Similar to the example configuration in FIG. 11, the bit group identification module 1202 is configured to receive a plurality of unsatisfied check numbers for the plurality of bits of a codeword, and identify which of the plurality of bit groups each of the unsatisfied check numbers belongs. The empirical distribution module 1204 is configured to generate, for each of the bit groups, an empirical distribution of the numbers of unsatisfied checks of a bit group. Accordingly, the empirical distribution module 1204 receives from the bit group identification module 1202 the unsatisfied check numbers and an indication to which each bit group each of the unsatisfied check numbers is associated. In some example configurations, the unsatisfied check numbers are configured as a vector, and the relative positionings of the unsatisfied check numbers in the vector identify with which bit group each of the unsatisfied check numbers is associated. In turn, the empirical distribution module 1204 is configured to generate an empirical distribution for a given bit group by generating an empirical distribution of the numbers of unsatisfied checks for the bits of the given bit group. The empirical distribution module 1204 may generate a plurality of empirical distributions in this way, each for a respective one of the plurality of bit groups.

For at least some example configurations, the empirical distribution module 1204 is configured to generate an empirical distribution through execution of an algorithm that includes a mathematical formula or equation for calculating the empirical distribution. The empirical distribution module 1204 may receive the unsatisfied check numbers of the bits for a given bit group, and execute the algorithm with the unsatisfied check numbers as inputs to the algorithm. In turn, the empirical distribution module 1204 may generate a set of values that forms the empirical distribution.

In some example configurations, the empirical distribution module 1204 is configured to generate each of the empirical distributions as discrete probability distributions. For other example configurations, the empirical distribution module 1204 is configured to generate each of the empirical distributions as histograms, where the empirical distribution module 1204 groups the unsatisfied check numbers into bins.

The scoring module 1200 may further include a distribution comparison module 1206 configured to compare the empirical distribution of the bit groups with at least one of an unreliable expected distribution or a reliable expected distribution. The scoring module 1200 may further include a reliable expected distribution module 1208 that includes a memory that stores a reliable expected distribution for reliable bit groups, and an unreliable expected distribution 1210 that includes a memory that stores an unreliable expected distribution for unreliable bit groups. The distribution comparison module 1206 may be configured to retrieve the reliable expected distribution from reliable expected distribution module 1208, and retrieve the unreliable expected distribution from the unreliable expected distribution module 1210. Other example embodiments of the scoring module 1200, particularly those where the distribution comparison module 1206 compares the empirical distributions with only one of the expected distributions, may only include the expected distribution module that the distribution comparison module 1206 uses in its comparison.

Additionally, in some example configurations, the unreliable expected distribution and the reliable expected distribution may be distributions that are generated in offline or external processes—i.e., processes that are performed outside of an error correction process, external to the memory system, or a combination thereof. For example, the unreliable and reliable expected distributions may be distributions that are loaded into the memory system 100 during manufacturing. For such example configurations, the reliable and unreliable expected distribution modules 1208, 1210 have the functions of storing the respective reliable and unreliable expected distributions that the distribution comparison module 1206 can access or retrieve. For other example configurations, one or both of the reliable and unreliable expected distribution modules 1208, 1210 may calculate their respective expected distributions as on-line processes, through execution of respective algorithms. The reliable and unreliable expected distribution modules 1208, 1210 may calculate their respective expected distributions either during an error correction process, such as during a portion of a time period during which the scoring module 1200 calculates the scores based on the unsatisfied check numbers, or during other time periods outside if the error correction processes. Example algorithms used to generate reliable and unreliable expected distributions, either as online or offline processes, are described in further detail below.

As mentioned, the distribution comparison module 1206 may be configured to compare the empirical distributions of the bit groups with at least one of the unreliable expected distribution or the reliable expected distribution by calculating statistical similarities, such as statistical distances or statistical divergences, between the empirical distributions and the unreliable expected distribution, between the empirical distributions and the reliable expected distribution, or a combination of the two. To calculate a statistical similarity, the distribution comparison module 1206 may be configured to execute an algorithm that includes at least one statistical similarity (e.g., at least one statistical distance or divergence) formula, function, or equation $D(p_y, p_{ex})$, where $p_y$ is an empirical distribution input to the statistical similarity function D, and $p_{ex}$ is generally an unreliable or a reliable expected distribution input to the statistical similarity function. Also, herein, the general notation used for the statistical similarity function $D(p_y, p_{ex})$ is not limiting and refers generally to a statistical function that determines or measures statistical similarities or proximities between an empirical distribution $p_y$ and an expected distribution $p_{ex}$, examples of which include a statistical distance from the empirical distribution $p_y$ to the expected distribution $p_{ex}$, a statistical distance from the expected distribution $p_{ex}$ to the empirical distribution $p_y$, a statistical divergence of the empirical distribution $p_y$ from the expected distribution $p_{ex}$, or a statistical divergence of the expected distribution $p_{ex}$ from the empirical distribution $p_y$.

In some example embodiments, the distribution comparison module 1206 may calculate, for each of the bit groups, a score based on or dependent on a statistical similarity between an empirical distribution $p_y$ for a bit group and an unreliable expected distribution $p_{uex}$, represented as $D(p_y, p_{uex})$. In some examples, the distribution comparison module 1206 sets the score to be equal to the statistical similarity value resulting from execution of the statistical similarity function $D(p_y, p_{uex})$. In other examples, the distribution comparison module 1206 weights the calculated statistical similarity by a constant or other weighting factor. In such examples, the score may be based on, dependent on, and/or proportionate to the statistical similarity $D(p_y, p_{uex})$, though not necessarily equal to the statistical similarlity $D(p_y, p_{uex})$.

In other example embodiments, the distribution comparison module 1206 may calculate, for each of the bit groups, a score based on or dependent on a ratio of two statistical similarities, including a first statistical similarity $D(p_y, p_{uex})$ between an empirical distribution $p_y$ and an unreliable expected distribution $p_{uex}$, and a second statistical similarity $D(p_y, p_{rex})$ between the empirical distribution $p_y$ and a reliable expected distribution $p_{rex}$. In some example configurations, the first statistical similarity $D(p_y, p_{uex})$ is the numerator, and the second statistical similarity $D(p_y, p_{rex})$ is the denominator, such that the ratio is equal to: $D(p_y, p_{uex})/D(p_y, p_{rex})$. In other example configurations, the second statistical similarity $D(p_y, p_{rex})$ is the numerator, and the first statistical similarity $D(p_y, p_{uex})$ is the denominator, such that the ratio is equal to $D(p_y, p_{rex})/D(p_y, p_{uex})$. Also, in some examples, the distribution comparison module 1206 sets the score to be equal to the ratio it calculates. In other examples, the distribution comparison module 1206 weights the calculated ratio by a constant or other weighting factor. In such examples, the score may be based on, dependent on, and/or proportionate to the ratio, though not necessarily equal to the ratio.

In other example embodiments, the distribution comparison module 1206 may calculate, for each of the bit groups, a score based on or dependent on a difference between two statistical similarities, including a first statistical similarity $D(p_y, p_{uex})$ between an empirical distribution $p_y$ and an unreliable expected distribution $p_{uex}$, and a second statistical similarity $D(p_y, p_{rex})$ between the empirical distribution $p_y$ and a reliable expected distribution $p_{rex}$. In some example configurations, the distribution comparison module 1206 subtracts the second statistical similarity $D(p_y, p_{rex})$ from the first statistical similarity $D(p_y, p_{uex})$, such that the difference is equal to: $D(p_y, p_{uex}) - D(p_y, p_{rex})$. In other example configurations, the distribution comparison module 1206 subtracts the first statistical similarity $D(p_y, p_{uex})$ from the second statistical similarity $D(p_y, p_{rex})$, such that the difference is equal to: $D(p_y, p_{rex}) - D(p_y, p_{uex})$. Also, in some examples, the distribution comparison module 1206 sets the score to be equal to the difference it calculates. In other examples, the distribution comparison module 1206 weights the calculated difference by a constant or other weighting factor. In such examples, the score may be based on, dependent on, and/or proportionate to the difference, though not necessarily equal to the difference.

Various other example embodiments may be possible, including embodiments that combine ratios and differences through any of various mathematical operations, or otherwise perform any of various mathematical operations, non-limiting examples including addition, subtraction, multiplication, division, or exponential or logarithmic-based operations.

The distribution comparison module 1206 may be configured to execute any of various types of statistical similarity functions, such as statistical distance or divergence formulas, equations, or functions, in order to calculate or measure a statistical similarity or proximity, such as in the form of a statistical distance or divergence, between an empirical distribution and an expected distribution, non-limiting examples of which include an f-divergence function, such as a Kullback-Leibler divergence, a reverse Kullback-Leibler divergence, a Hellinger distance, a total variation distance, Rényi divergence, a Jensen-Shannon divergence, or a Bhattacharyya distance. Other statistical similarity functions, such as other statistical distance or divergence functions, equations, or formulas may be possible.

When the distribution comparison module 1206 calculates the scores based on the comparison, such as by calculating the statistical similarities, the unreliable memory identification module 1008 may determine one on more unreliable bit groups, as previously described. For some example configurations, the unreliable memory identification module 1008 may use the scores to select a predetermined number of bit groups having empirical distributions closest to the unreliable expected distribution, or to determine whether each of the scores satisfies a threshold.

As previously described, the unreliable and reliable expected distributions may be determined through performance of an offline process external to a memory system and/or outside of an error correction process, or through performance of an online process during error correction, such as with the reliable expected distribution module 1208 and/or the unreliable expected distribution module 1210. The following provides example functions or formulas that a computing device may execute, either via an online process or an offline process, in order to generate the reliable and unreliable expected distributions.

The unreliable expected distribution may be a probability distribution that may be determined according to the following mathematical formula:

$$p_{uex} = Pr(U=i, BER_{eux}), i=0,1, \ldots dv \qquad (5)$$

where U is the number of unsatisfied checks, $BER_{uex}$ is an expected bit error rate (BER) for unreliable bits (i.e., bits stored in unreliable memory cells), dv is the number of checks connected to a bit, and i is an index. Qualtitatively, the unreliable expected distribution for an unreliable bit is the probability that the number of unsatisfied checks is i given the expected bit error rate for unreliable bits $BER_{uex}$, for values of i from 0 to the number of checks connected to the unreliable bit dv.

The probability Pr in equation (5) for a particular value of the index i, may be determined according to the following mathematical formula:

$$Pr(U = i, BER_{uex}) = \qquad (6)$$
$$Pr(U = i \mid \text{error}) Pr(\text{error}) + Pr(U = i \mid \text{correct}) Pr(\text{correct}).$$

Qualtitatively, the probability Pr that the number of unsatisfied checks is a particular value i for the expected BER for unreliable bits, is equal to the product of the probability that the number of unsatisfied checks U is the particular value i, given that the bit value of the bit is an error or incorrect, multiplied by the probability that the bit value is an error, plus the probability that the numbers of unsatisfied checks U is the particular value i, given that the bit value of the bit is correct, multiplied by the probability that the bit value is correct. In addition, the conditional probability Pr(U=i|error) can be determined according to the following mathematical formula:

$$Pr(U = i \mid \text{error}) = \binom{dv}{i}(q_e)^i(1-q_e)^{dv-i}, \quad (7)$$

where $$\binom{dv}{i}$$

is a binomial coefficient, and $q_e$ is the probability that a given check is unsatisfied given that a bit is incorrect, which can be determined according to the following mathematical formula:

$$q_e = \quad (8)$$
$$Pr(\text{check is unsatisfied} \mid \text{bit is incorrect}) = \frac{1}{2}(1 + (1-2\cdot BER)^{dc-1})$$

where BER is the channel bit error rate, and dc is the number of bits or variable nodes connected to the given check.

In addition, the probability that the bit value is an error P(error) is the expected bit error rate for unreliable bits $BER_{uex}$. In addition, the conditional probability Pr(U=i|correct) can be determined according to the following mathematical formula:

$$Pr(U = i \mid \text{correct}) = \binom{dv}{i}(q_c)^i(1-q_c)^{dv-i}, \quad (9)$$

where $q_c$ is the probability that a given check is unsatisfied given that a bit is correct, which can be determined according to the following mathematical formula:

$$q_c = \quad (10)$$
$$Pr(\text{check is unsatisfied} \mid \text{bit is correct}) = \frac{1}{2}(1 - (1-2\cdot BER)^{dc-1}).$$

In addition, the probability that the bit value is correct P(correct) is 1 minus the expected bit error rate for unreliable bits $BER_{uex}$, or $(1-BER_{uex})$.

Similarly, the reliable expected distribution may be a probability distribution that may be determined according to the following mathematical formula:

$$p_{rex} = Pr(U=i, BER_{rex}), i=0,1,\ldots dv \quad (11)$$

where $BER_{rex}$ is an expected bit error rate (BER) for reliable bits (i.e., bits stored in reliable memory cells). Qualtitatively, the reliable expected distribution for a reliable bit is the probability that the number of unsatisfied checks is i given the expected bit error rate for reliable bits $BER_{rex}$, for values of i from 0 to the number of checks connected to the reliable bit dv.

The probability Pr in equation (11) can be calculated in the same way as the probability in equation (6), i.e., using formulas (7)-(10), except that the probability that the bit is an error P(error) is the expected bit error rate for reliable bits $BER_{rex}$, and the probability that the bit value is correct P(correct) is 1 minus the expected bit error rate for reliable bits $BER_{rex}$, or $(1-BER_{rex})$.

Figure 13:
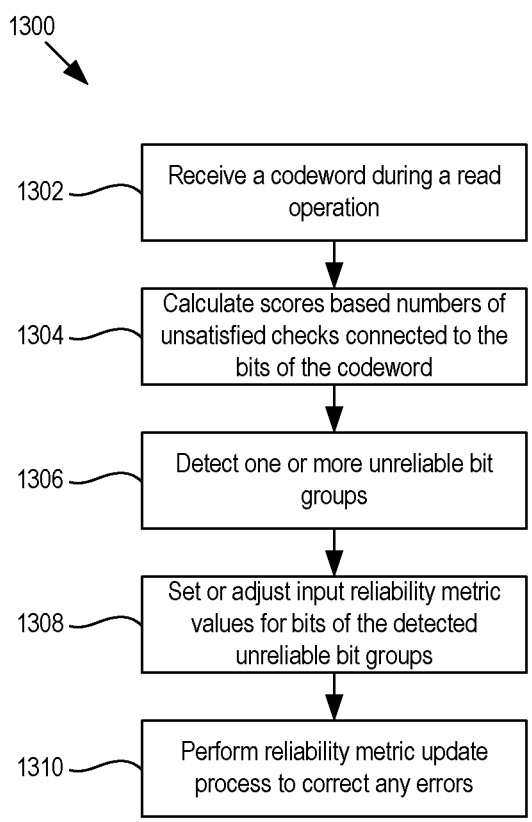
FIG. 13 is a flow chart of an example method of performing an error correction process.

FIG. 13 shows a flow chart of an example method 1300 of performing an error correction process during a read operation. At block 1302, the controller 102, such as with the data retrieval module 802, may receive a codeword from a memory die and load the codeword into the RAM 116. At block 1304, the controller 102, such as with the unreliable memory detection module 826, may calculate a plurality of scores for a plurality of bit group of the codeword based on an error correction code, such as by using the error correction code to calculate a plurality of unsatisfied checks connected to the variable nodes for the bits of the codeword. The scores may be based on sums of the numbers of the unsatisfied checks for the bit groups, or may be based on comparisons between empirical distributions of the unsatisfied checks and at least one of an unreliable expected distribution or a reliable expected distribution, as previously described.

At block 1306, the controller 102, such as with the unreliable memory detection module 826, may detect one or more unreliable bit groups based on the scores. For example, the controller 102 may detect a predetermined number of highest ranked bit groups (bit groups with the highest degree of unreliability) based on the scores, or may detect whether each of the bit groups is unreliable by determining whether their respective scores satisfy a threshold, as previously described.

At block 1308, the controller 102, such as with the reliability metric module 808, may set or adjust reliability metric values, such as LLR values, of bits of the one or more unreliable bit groups to indicate low likelihoods of the bits of the bit group(s) having correct bit values, corresponding to the detection of the unreliable bit groups. At block 1310, the controller 102, such as with the reliability metric update module 814, may perform the reliability metric update process to update or adjust one or more sets of updated LLR values, in order to correct any incorrect bit values, dependent on the input reliability metric values set or adjusted based on the detection of the unreliable bit group(s). For methods where the controller 102 did not yet start the reliability metric update process before the input reliability metric values are set dependent on the detected unreliable bit group(s), then at block 1310, the controller 102 may start the reliability metric update process with the initial reliability metric values set dependent on the detected unreliable bit group(s). For other methods where the controller 102 already started the reliability metric update process, before the reliability metric values are set dependent on the detected unreliable bit group(s), then at block 1310, the controller 102 may resume the reliability metric update process with the input reliability metric values set dependent on the detected unreliable bit group(s).

A means for receiving a bit group of data stored in a memory array, in various embodiments, may include the controller 102, the RAM 116, the memory interface 130, the data retrieval module 802, or the like. Other embodiments may include similar or equivalent means for receiving a bit group of data stored in a memory array.

A means for generating an empirical distribution for a bit group based on an error correction code, in various embodiments, may include the controller 102, the ECC module 124, the unreliable memory detection module 826, the scoring module 1006, the empirical distribution module 1204, or the like. Other embodiments may include similar or equivalent means for generating an empirical distribution for a bit group based on an error correction code.

A means for comparing an empirical distribution for a bit group with an expected distribution, in various embodiments, may include the controller 102, the ECC module 124, the unreliable memory detection module 826, the scoring module 1006, the distribution comparison module 1206, or the like. Other embodiments may include similar or equivalent means for comparing an empirical distribution for a bit group with an expected distribution.

A means for identifying that a bit group is unreliable based on a comparison of an empirical distribution for a bit group with an expected distribution, in various embodiments, may include the controller 102, the ECC module 124, the unreliable memory detection module 826, the unreliable memory identification module 1008, or the like. Other embodiments may include similar or equivalent means for identifying that a bit group is unreliable based on a comparison of an empirical distribution for a bit group with an expected distribution.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A circuit comprising:
   a memory array comprising a plurality of memory cells; and
   a controller configured to:
      receive a bit group of data stored in the memory array;
      generate an empirical distribution of numbers of unsatisfied checks for the bit group based on an error correction code;
      compare the empirical distribution for the bit group with an expected distribution; and
      in response to the comparison, identify that the bit group is unreliable.

2. The circuit of claim 1, wherein the controller is configured to:
   calculate a statistical similarity between the empirical distribution and the expected distribution to compare the empirical distribution with the expected distribution.

3. The circuit of claim 2, wherein the controller is further configured to:
   calculate a score based on the statistical similarity; and
   identify that the bit group is unreliable based on the score.

4. The circuit of claim 3, wherein the controller is configured to identify that the bit group is unreliable in response to the score satisfying a threshold.

5. The circuit of claim 3, wherein the controller is configured to identify that the bit group is unreliable in response to the score being one of a predetermined number of highest ranked scores.

6. The circuit of claim 3, wherein the expected distribution comprises an expected distribution of numbers of unsatisfied checks for an unreliable bit group.

7. The circuit of claim 6, wherein the statistical similarity comprises a first statistical similarity, and wherein the controller is further configured to:
   calculate a second statistical similarity between the empirical distribution and an expected distribution of numbers of unsatisfied checks for a reliable bit group; and
   calculate the score based on the first statistical similarity and the second statistical similarity.

8. The circuit of claim 7, wherein the controller is configured to calculate the score based on a ratio between the first statistical similarity and the second statistical similarity.

9. The circuit of claim 7, wherein the controller is configured to calculate the score based on a difference between the first statistical similarity and the second statistical similarity.

10. The circuit of claim 1, wherein the controller is further configured to:
    generate a plurality of empirical distributions for a plurality of bit groups of a codeword, the bit group comprising one of the plurality of bit groups;
    compare the plurality of empirical distributions with the expected distribution; and
    identify that at least the bit group of the plurality of bit groups is unreliable based on the comparisons.

11. The circuit of claim 1, wherein the controller is configured to generate the empirical distribution based on numbers of unsatisfied checks connected to variable nodes for bits of the bit group.

12. A circuit comprising:
    a memory configured to store a data set received from a memory die during a read operation;
    a check circuit configured to calculate a plurality of numbers of unsatisfied checks for a plurality of bit groups of the data set;
    an unreliable memory detection circuit configured to detect an unreliable memory cell based on the plurality of numbers of unsatisfied checks; and
    an initial reliability metric circuit configured to set an initial reliability metric value for a bit stored in the unreliable memory cell based on the detection.

13. The circuit of claim 12, further comprising:
    a reliability metric update circuit configured to adjust an updated reliability metric value for the data set based on the initial reliability metric value.

14. The circuit of claim 13, wherein the reliability metric update circuit is configured to adjust a plurality of updated reliability metric values over a plurality of cycles of a reliability metric update process dependent on the initial reliability metric value.

15. The circuit of claim 12, wherein the initial reliability metric comprises an initial log likelihood ratio (LLR) value.

16. The circuit of claim 12, wherein the initial reliability metric circuit is configured to adjust the initial reliability metric value to reduce a likelihood that the bit has a correct bit value.

17. The circuit of claim 12, wherein the check circuit is configured to calculate the plurality of numbers of unsatisfied checks in response to a triggering event occurring after a start of a reliability metric update process to error correct the data set.

18. The circuit of claim 12, wherein the unreliable memory detection circuit is configured to detect the unreliable memory cell in response to a triggering event occurring after a start of a reliability metric update process to error correct the data set.

19. A system comprising:
a memory die;
a controller comprising:
  a parity bit generator circuit configured to:
    generate a plurality of parity bits for a set of information bits based on an error correction code; and
    append the plurality of parity bits to the set of information bits to form a codeword;
  a memory interface circuit configured to output the codeword to the memory die for storage;
  a data retrieval circuit configured to receive the codeword from the memory die during a read operation;
  a scoring circuit configured to calculate a score for the codeword based on the error correction code used to generate the parity bits; and
  an unreliable memory identification circuit configured to detect that a portion of the codeword is stored in an unreliable group of memory cells based on the score.

20. The system of claim 19, wherein the scoring circuit is configured to calculate the score based on numbers of unsatisfied checks of bits that comprises the portion stored in the unreliable group of memory cells.

21. A method comprising:
receiving, with a controller, a data set during a read operation;
calculating, with the controller, a plurality of empirical distributions for a plurality of groups of bits of the data set based on numbers of unsatisfied checks of the bits of the data set;
detecting, with the controller, an unreliable bit line based on the plurality of empirical distributions; and
storing, with the controller, an identifier that identifies the unreliable bit line in a memory.

22. A circuit comprising:
a means for receiving a bit group of data stored in a memory array;
a means for comparing an empirical distribution for the bit group with an expected distribution; and
a means for identifying that the bit group is unreliable in response to the comparison.

23. The circuit of claim 1, wherein the empirical distribution is a continuous probability distribution.

24. The circuit of claim 1, wherein the empirical distribution is one of a threshold voltage probability distribution and a threshold distribution of a number of memory cells as a function of threshold voltage.

* * * * *